(12) United States Patent
Li et al.

(10) Patent No.: US 6,342,324 B1
(45) Date of Patent: Jan. 29, 2002

(54) RELEASE LAYERS AND COMPOSITIONS FOR FORMING THE SAME

(75) Inventors: Minyu Li, Oakdale; M. Zaki Ali, Mendota Heights; Eric D. Morrison, St. Paul; Charles W. Simpson, Lakeland; Leonard J. Stulc, Shafer; Ramnath Subramaniam, St. Paul; Jiayi Zhu, Woodbury, all of MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/504,461

(22) Filed: Feb. 16, 2000

(51) Int. Cl.$^7$ .................................................. G03G 5/147
(52) U.S. Cl. ............................... 430/67; 430/66; 430/132
(58) Field of Search ......................... 430/66, 67, 132; 524/860

(56) References Cited

U.S. PATENT DOCUMENTS

| | | | |
|---|---|---|---|
| 3,185,777 A | 5/1965 | Rheinfrank | 179/100.2 |
| 3,476,659 A | 11/1969 | Sato et al. | 204/18 |
| 3,554,836 A | 1/1971 | Steindorf | 156/240 |
| 3,607,258 A | 9/1971 | Hoegl et al. | 96/1.5 |
| 3,652,319 A | 3/1972 | Amidon et al. | 96/1 |
| 3,716,360 A | 2/1973 | Fukushima et al. | 96/1.4 |
| 3,839,032 A | 10/1974 | Smith et al. | 96/1.4 |
| 3,847,642 A | 11/1974 | Rhodes | 117/17.5 |
| 3,851,964 A | 12/1974 | Smith et al. | 355/10 |
| 3,939,085 A | 2/1976 | Smith et al. | 252/62.12 |
| 4,134,763 A | 1/1979 | Fujimura et al. | 96/1.5 |
| 4,216,283 A | 8/1980 | Cooper et al. | 430/126 |

(List continued on next page.)

FOREIGN PATENT DOCUMENTS

| | | |
|---|---|---|
| JP | 60057847 | 4/1985 |
| JP | 1057266 | 3/1989 |
| JP | 1059233 | 3/1989 |
| JP | 1191858 | 8/1989 |
| JP | 2004271 | 1/1990 |
| JP | 2110471 | 4/1990 |
| JP | 5119502 | 5/1993 |
| JP | 7120951 | 5/1995 |
| WO | WO 95/02853 | 1/1995 |
| WO | WO 98/45760 | 10/1998 |
| WO | WO 98/45761 | 10/1998 |

OTHER PUBLICATIONS

Borsenberger and Weiss, "Photoreceptors: Organic Photoconductors," Ch. 9, Handbook of Imaging Materials, Ed. Arthur S. Diamond, Marcel Dekker, Inc. 1991.
Borsenberger and Weiss, "Organic Photoreceptors for Imaging Systems," Marcel Dekker Inc., New York 1993, p. 294.

Primary Examiner—John Goodrow
(74) Attorney, Agent, or Firm—Amelia A. Buharin

(57) ABSTRACT

Release compositions include (a) from zero to about 30 parts by weight of a polymer selected from the group consisting of

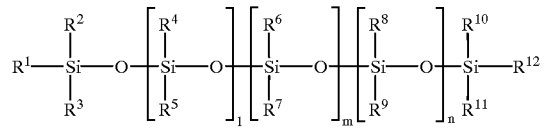

wherein $R^1$, $R^2$, $R^3$, $R^6$, $R^7$, $R^{10}$, $R^{11}$, and $R^{12}$ are each independently selected from an alkyl group, an alkenyl group, an aryl group, and an aralkyl group, such that at least one of $R^6$ and $R^7$ is an alkenyl group, l, m, and n are each independently an integer so long as the polymer contains greater than 3 mol % vinyl-containing siloxane groups; a (vinyl siloxy)(siloxy)-modified silica having a vinyl content of at least about 0.4 vinyl equivalent/kg; and a combination thereof;

(b) more than about 20 parts by weight of a polymer having the formula

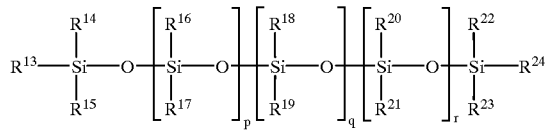

wherein $R^{13}$, $R^{14}$, $R^{15}$, $R^{18}$, $R^{19}$, $R^{22}$, $R^{23}$, and $R^{24}$ are each independently selected from an alkyl group, an alkenyl group, an aryl group, and an aralkyl group, such that at least two of $R^{13}$, $R^{14}$, $R^{15}$, $R^{18}$, $R^{19}$, $R^{22}$, $R^{23}$, and $R^{24}$ are alkenyl groups, p, q, and r are each independently integers so long as the polymer has less than 3 mol % vinyl-containing siloxane groups; and (c) up to about 20 parts by weight of a cross-linking agent of the formula

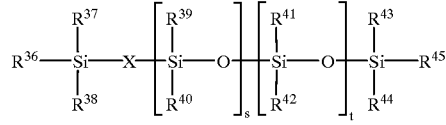

wherein $R^{36}$, $R^{37}$, $R^{38}$, $R^{43}$, $R^{44}$, and $R^{45}$ are each independently selected from hydrogen, an alkyl group, an aryl group, and an aralkyl group,
X is O, or a divalent organic linking group, and
s and t are independently integers so long as there are at least two functional groups capable of cross-linking per molecule.

16 Claims, 3 Drawing Sheets

U.S. PATENT DOCUMENTS

| | | | |
|---|---|---|---|
| 4,439,509 A | 3/1984 | Schank | 430/132 |
| 4,565,760 A | 1/1986 | Schank | 430/66 |
| 4,595,602 A | 6/1986 | Schank | 427/76 |
| 4,600,673 A | 7/1986 | Hendrickson et al. | 430/66 |
| 4,606,934 A | 8/1986 | Lee et al. | 427/76 |
| 4,728,983 A | 3/1988 | Zwadlo et al. | 355/4 |
| 4,770,966 A | 9/1988 | Kazama et al. | 430/66 |
| 4,794,064 A | 12/1988 | Yamazaki et al. | 430/58 |
| 4,923,775 A | 5/1990 | Schank | 430/59 |
| 5,073,466 A | 12/1991 | Ishikawa et al. | 430/66 |
| 5,106,710 A | 4/1992 | Wang et al. | 430/42 |
| 5,204,202 A | 4/1993 | Ishikawa et al. | 430/66 |
| 5,252,418 A | 10/1993 | Ishikawa et al. | 430/67 |
| 5,262,259 A | 11/1993 | Chou et al. | 430/47 |
| 5,275,853 A | 1/1994 | Silvis et al. | 428/35.4 |
| 5,300,990 A | 4/1994 | Thompson | 355/256 |
| 5,324,609 A | 6/1994 | Yagi et al. | 430/66 |
| 5,420,675 A | 5/1995 | Thompson et al. | 355/256 |
| 5,422,209 A | 6/1995 | Ono et al. | 430/57 |
| 5,576,815 A | 11/1996 | Teschendorf et al. | 355/256 |
| 5,596,398 A | 1/1997 | Woo et al. | 399/297 |
| 5,650,253 A | 7/1997 | Baker et al. | 430/119 |
| 5,652,078 A | 7/1997 | Jalbert et al. | 430/67 |
| 5,652,282 A | 7/1997 | Baker et al. | 523/201 |
| 5,659,851 A | 8/1997 | Moe et al. | 399/165 |
| 5,698,616 A | 12/1997 | Baker et al. | 523/201 |
| 5,733,698 A | 3/1998 | Lehman et al. | 430/66 |
| 5,754,928 A | 5/1998 | Moe et al. | 399/249 |
| 5,758,236 A | 5/1998 | Teschendorf et al. | 399/249 |
| 5,916,718 A | 6/1999 | Kellie et al. | 430/45 |
| 5,928,726 A | 7/1999 | Butler et al. | 427/261 |
| 5,965,243 A | 10/1999 | Butler et al. | 428/195 |
| 5,998,549 A | 12/1999 | Milbourn et al. | 525/396 |
| 6,001,522 A | 12/1999 | Woo et al. | 430/65 |
| 6,020,098 A | 2/2000 | Bretscher et al. | 430/66 |
| 6,030,736 A | 2/2000 | Ikegami et al. | 430/67 |

RELEASE LAYERS AND COMPOSITIONS FOR FORMING THE SAME

FIELD OF THE INVENTION

The present invention relates to a release layer, and a composition for forming the same that is particularly well suited to a photoconductor element in a liquid electrophotographic system. More specifically, this invention relates to a release coating for the photoconductor element.

BACKGROUND OF THE INVENTION

Electrophotography forms the technical basis for various well known imaging processes, including photocopying and some forms of laser printing. The basic electrophotographic process involves placing a uniform electrostatic charge on a photoconductor element, imagewise exposing the photoconductor element to activating electromagnetic radiation, also referred to herein as "light," thereby dissipating the charge in the exposed areas, developing the resulting electrostatic latent image with a toner, and transferring the toner image from the photoconductor element to a final substrate, such as paper, either by direct transfer or via an intermediate transfer material.

The structure of a photoconductor element may be a continuous belt, which is supported and circulated by rollers, or a rotatable drum. The photoconductive layer is generally affixed to an electroconductive support. The surface of the photoconductor is either negatively or positively charged such that when activating electromagnetic radiation strikes the photoconductive layer, charge is conducted through the photoconductor in that region to neutralize or reduce the surface potential in the illuminated region. An optional barrier layer may be used over the photoconductive layer to protect the photoconductive layer and extend the service life of the photoconductive layer. Other layers, such as adhesive or priming layers or charge injection blocking layers, are also used in some photoconductor elements.

Typically, a positively charged toner is attracted to those areas of the photoconductor element which retain a negative charge after the imagewise exposure, thereby forming a toner image that corresponds to the electrostatic latent image. The toner need not be positively charged. Some toners are attracted to the areas of the photoconductor element where the charge has been dissipated. The toner may be either a powdered material comprising a blend of polymer and colored particulates, typically carbon, or a liquid material of finely divided solids dispersed in an insulating liquid. Liquid toners are often preferable because they are capable of giving higher resolution images.

The toner image may be transferred to the substrate or an intermediate carrier by means of heat, pressure, a combination of heat and pressure, or electrostatic assist. A common problem that arises at this stage of electrophotographic imaging is poor transfer from the photoconductor to the receptor. Poor transfer may be manifested by low transfer efficiency and low image resolution. Low transfer efficiency results in images that are light and/or speckled. Low image resolution results in images that are fuzzy. These transfer problems may be alleviated by the use of a release coating.

The release layer is applied over the photoconductive layer or over the barrier layer if a barrier layer is being used. The release layer preferably adheres well to the photoconductive, a barrier layer, or a tie layer. Moreover, the release layer must not significantly interfere with the charge dissipation characteristics of the photoconductor construction.

Typical release coatings known in the electrophotographic arts include silicone polymers such as those disclosed in U.S. Pat. Nos. 4,600,673 and 5,733,698. Conventional siloxane release materials tend to swell significantly in the hydrocarbon solvents that are used as carrier liquids in electrophotography. Swollen polymers generally have reduced strength and are more easily abraded or easily delaminate when applied in an electrophotograhic system.

U.S. Pat. No. 5,652,078 describes another type of release layer that includes a cross-linked siloxane polymer with a bimodal distribution of chain lengths between crosslinks, wherein the siloxane polymer is the reaction product of the components comprising:

A) 35 to 80 parts by weight of a siloxane polymer with a high content of functional groups capable of crosslinking having the formula:

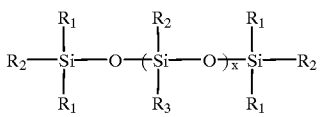

where each $R_1$ and $R_3$ independently is an alkyl group, aryl group, or alkenyl group, $R_2$ is, independently for each group $-SiR_2R_3O-$ and each group $-SiR_1R_1R_2$, either an alkyl group, an aryl group, or a functional group capable of cross-linking and at least 3% of $R_2$ are functional groups capable of crosslinking, and x is an integer greater than 0; and B) greater than 0 and less than or equal to 50 parts by weight of a siloxane polymer with a low content of functional groups capable of crosslinking having the formula

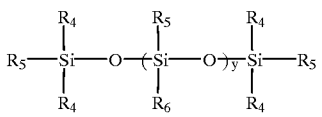

where each $R_4$ and $R_6$ independently is an alkyl group, aryl group, or alkenyl group, $R_5$ is, independently for each group $-SiR_5R_6O-$ and each group $-Si(R_4)_2R_5$, either an alkyl group, an aryl group or a functional group capable of cross-linking and no more than 2.5% of $R_5$ are functional groups capable of cross-linking, and y is an integer of at least 50. Optionally, the siloxane polymer can include a crosslinking agent, preferably in an amount from 5 to 30 parts by weight.

SUMMARY OF THE INVENTION

What is yet needed is a photoconductor that is capable of withstanding more imaging cycles per photoconductor construction and thus, a more durable release layer is desired. Specifically, the release layer should be mechanically durable to withstand abrasion of the various rollers and scrapers which contact the photoconductor element. The release layer must also be resistant to toner carrier liquids.

One aspect of the present invention provides a photoconductor construction comprising a photoconductor layer, and an electroconductive substrate, and a release layer which displays good release properties, as well as good durability, low peel force, preferably less than about 13 g/2.54 cm, and resistance to toner carrier liquids.

Solvent resistance may be improved by adding fillers to or by cross-linking the polymer. However, highly cross-linked or filled systems tend to have increased surface energy that causes a decreased release performance. The present invention provides a release layer that has increased solvent resistance with minimal sacrifice of release properties.

In one embodiment, a release composition includes a siloxane polymer with a bimodal distribution of chain lengths between crosslinks that is, preferably, the reaction product of a polymer with high functionality, a polymer with low functionality, and a cross-linking agent. However, this polymer could alternatively be the cross-linked product of a single polymer provided the functional groups were spaced appropriately to provide a bimodal distribution of chain lengths between crosslinks. Such a polymer can be synthesized using anionic polymerization methods as are known to those skilled in the art.

As used herein, "functionality" and "functional groups" is an indication of reactive groups. A polymer with high functionality has more reactive groups than a polymer with low functionality. Some reactive groups would include those groups that undergo free radical reactions, condensation reactions, hydrosilation addition reactions, hydrosilane/silanol reactions, or photoinitiated reactions.

As used herein, "chain length between crosslinks" indicates how many monomeric units are in the backbone of the polymer between monomeric units from which branching or cross-linking has occurred. The bimodal distribution of such chain lengths indicates that there are a high number of relatively short chains between crosslinks and a high number of relatively long chains between crosslinks, but only a small number of chains having an intermediate length between crosslinks.

The crosslinking of the siloxanes can be undertaken by any of a variety of methods including free radical reactions, condensation reactions, hydrosilylation addition reactions, hydrosilane/silanol reactions, and photoinitiated reactions relying on the activation of an intermediate to induce subsequent cross-linking.

Thus, one aspect of the present invention provides a photoconductor element including an electroconductive substrate, a photoconductive layer on one surface of the electroconductive substrate, and over the photoconductive layer, a release layer.

Another aspect of the present invention provides an electrophotographic system for producing a multi-colored image including a photoreceptor comprising:
  an organic photoconductor having a first major surface and a second major surface; and
  a barrier layer on the first major surface of the photoconductor;
  a positioner for movably positioning the photoreceptor in order that a given portion of the photoreceptor sequentially advances through a plurality of locations in a single pass;
  at least one image-wise exposing device for exposing the photoreceptor with radiation modulated in accordance with an image data for one of a plurality of colors in order to partially discharge the photoreceptor to a first discharge level to produce an image-wise distribution of charges on the photoreceptor corresponding to the image data for the one of a plurality of colors;
  at least one applicator to apply a first color liquid toner comprising charged particles of the first color and transparent counter-ions, using an electrode electrically biased to a voltage of between the predetermined charge level and the first discharge level, to the photoreceptor as a function of the image-wise distribution of charges on the photoreceptor to form a first color image, wherein a second substantially uniform predetermined photoreceptor charge level results such that it is lower than the first predetermined charge level but being sufficiently high to subsequently repel liquid toner in areas not subsequently further discharged;
  a transferor to transfer at least the first color image and the second color image to a medium to form the multi-colored image; and
  a drying element for drying the multi-colored image, wherein at least one of the organic photoconductor and the drying element comprises a release layer.

Preferably, either the photoconductor, the drying element, or both is in the form of an endless belt. Alternatively, the photoconductor can be a drum, preferably an amorphous silicon drum.

In accordance with the present invention, the release layer indicated above includes a silicone polymer which is the reaction product of components comprising:
  (a) from zero to about 30 parts by weight of a polymer selected from the group consisting of

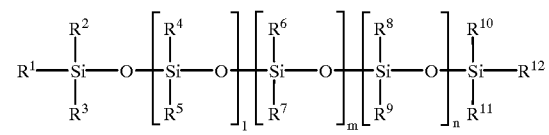

wherein $R^1$, $R^2$, $R^3$, $R^6$, $R^7$, $R^{10}$, $R^{11}$, and $R^{12}$ are each independently selected from an alkyl group, an alkenyl group, an aryl group, and an aralkyl group, such that at least one of $R^6$ and $R^7$ is an alkenyl group,
  $R^4$, $R^5$, $R^8$, and $R^9$ are each independently selected from an alkyl group, an aryl group, and an aralkyl group,
  l, m, and n are each independently an integer so long as the polymer contains greater than 3 mol % vinyl-containing siloxane groups; a (vinyl siloxy)(siloxy)-modified silica having a vinyl content of at least about 0.4 vinyl equivalent/kg; and a combination thereof;
  (b) more than about 20 parts by weight of a polymer having the formula

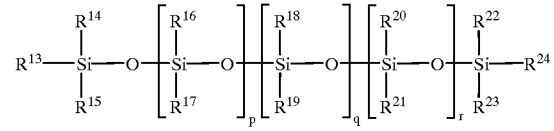

wherein $R^{13}$, $R^{14}$, $R^{15}$, $R^{18}$, $R^{19}$, $R^{22}$, $R^{23}$, and $R^{24}$ are each independently selected from an alkyl group, an alkenyl group, an aryl group, and an aralkyl group, such that at least two of $R^3$, $R^{14}$, $R^{15}$, $R^{18}$, $R^{19}$, $R_{22}$, $R^{23}$, and $R^{24}$ is an alkenyl group,
  $R^{16}$, $R^{17}$, $R^{20}$, and $R^{21}$ are each independently selected from an alkyl group, an aryl group, and an aralkyl group,
  p, q, and r are each independently integers so long as the polymer has less than 3 mol % vinyl-containing siloxane groups; and
  (c) up to about 20 parts by weight of a cross-linking agent of the formula

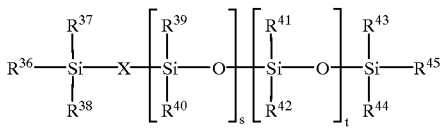

wherein $R^{36}$, $R^{37}$, $R^{38}$, $R^{43}$, $R^{44}$, and $R^{45}$ are each independently selected from hydrogen, an alkyl group, an aryl group, and an aralkyl group, $R^{39}$, $R^{40}$, $R^{41}$, and $R^{42}$ are each independently selected from hydrogen, an alkyl group (preferably having from 1 to 3 carbon atoms), and an aryl group, X is O, or a divalent organic linking group, and s and t are independently integers so long as there are at least two functional groups capable of cross-linking per molecule.

Preferably, the polymer in part (a) is from about 5 to about 20 parts by weight, the amount of polymer in part (b) is from about 30 to about 90 parts by weight, and the amount of the crosslinking agent is from about 5 to about 15 parts by weight. More preferably, the amount of the polymer in part (a) is from about 10 to about 16 parts by weight, the amount of polymer in part (b) is from about 60 to about 80 parts by weight, and the amount of crosslinking agent in part (c) is from about 8 to about 12 parts by weight.

Preferably, the polymer of part (a) contains greater than about 7 mol % vinyl-containing siloxane groups. Preferably, at least one of $R^6$ and $R^7$ is a vinyl-containing group.

Preferably, in the polymer in part (b), at least two of $R^{13}$, $R^{14}$, $R^{15}$, $R^{18}$, $R^{19}$, $R^{22}$, $R^{23}$, $R^{24}$ is a vinyl-containing group such that the polymer in part (b) preferably has a vinyl content less than about 2 mol % vinyl-containing siloxane groups and, more preferably, has a vinyl content less than about 0.5 mol % vinyl-containing siloxane groups.

In one embodiment, the (vinyl siloxy)(siloxy)-modified silica of part (a) is a vinyl Q resin and, more preferably, has the formula:

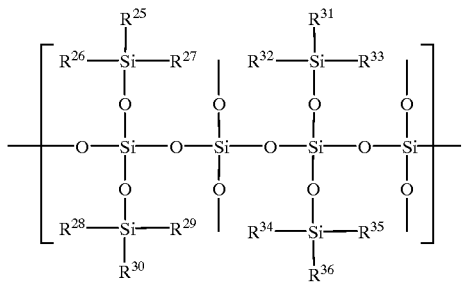

wherein $R^{25}$, $R^{26}$, $R^{27}$, $R^{28}$, $R^{29}$, $R^{30}$, $R^{31}$, $R^{32}$, $R^{33}$, $R^{34}$, $R^{35}$, and $R^{36}$ are each independently selected from an alkyl group, an alkenyl group, an aryl group, and an aralkyl group, wherein at least one alkenyl group, preferably a vinyl-containing group, is present in each of $—OSiR^{25}R^{26}R^{27}$; $—OSiR^{28}R^{29}R^{30}$; $—OSiR^{31}R^{32}R^{33}$; and $—OSiR^{34}R^{35}R_{36}$ so long as the polymer has a vinyl content of at least about 0.4 vinyl equivalent/kg. One preferred example is a (methylvinylsiloxy), trimethylsiloxy modified silica.

Yet another aspect of the present invention provides a composition for forming a layer having a low peel force comprising:

(a) from zero to about 30 parts by weight of a polymer selected from the group consisting of

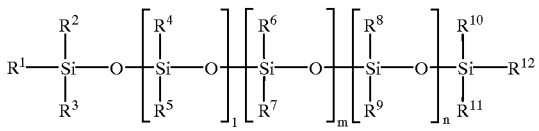

wherein $R^1$, $R^2$, $R^3$, $R^6$, $R^7$, $R^{10}$, $R^{11}$, and $R^{12}$ are each independently selected from an alkyl group, an alkenyl group, an aryl group, and an aralkyl group, such that at least one of $R^6$ and $R^7$ is an alkenyl group, $R^4$, $R^5$, $R^8$, and $R^9$ are each independently selected from an alkyl group, an aryl group, and an aralkyl group, l, m, and n are each independently an integer so long as the polymer contains greater than 3 mol % vinyl-containing siloxane groups; a (vinyl siloxy)(siloxy)-modified silica having a vinyl content of at least about 0.4 vinyl equivalent/kg; and a combination thereof;

(b) more than about 20 parts by weight of a polymer having the formula

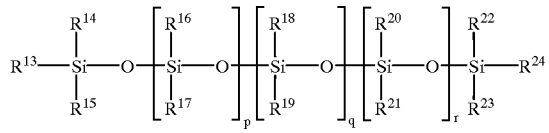

wherein $R^{13}$, $R^{14}$ $R^{15}$, $R^{18}$, $R^{19}$, $R^{22}$, $R^{23}$, and $R^{24}$ are each independently selected an alkyl group, an alkenyl group, an aryl group, and an aralkyl group, such that at least two of $R^{13}$, $R^{14}$, $R^{15}$, $R^8$, $R^{19}$, $R^{22}$, $R^{23}$, and $R^{24}$ is an alkenyl group, $R^{16}$, $R^{17}$, $R^{20}$, and $R^{21}$ are each independently selected from an alkyl group, an aryl group, and an aralkyl group, p, q, and r are each independently integers so long as the polymer has less than 3 mol % vinyl-containing siloxane groups; and (c) up to about 20 parts by weight of a cross-linking agent of the formula

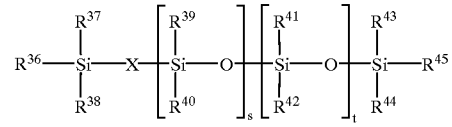

wherein $R^{36}$, $R^{37}$, $R^{38}$, $R^{43}$, $R_{44}$, and $R^{45}$ are each independently selected from hydrogen, an alkyl group, an aryl group, and an aralkyl group, $R^{39}$, $R^{40}$, $R^{41}$, and $R^{42}$ are each independently selected from hydrogen, an alkyl group (preferably having from 1 to 3 carbon atoms), and an aryl group, X is O, or a divalent organic linking group, and s and t are independently integers so long as there are at least two functional groups capable of cross-linking per molecule. By "low peel force" it is meant that layer formed with the silicone polymer has a value of less than about 13.0 g/2.54 cm, tested per the "Peel Force" test defined in the Examples herein.

As is well understood in this area, substitution is not only tolerated, but is often advisable and substitution is anticipated on the compounds used in the present invention. As a means of simplifying the discussion and recitation of certain terminology used throughout this application, the terms "group" and "moiety" are used to differentiate between chemical species that allow for substitution or which may be substituted and those which do not so allow or may not be so substituted. Thus, when the term "group" is used to describe a chemical compound or substituent, the described chemical material includes the basic group and that group with conventional substitution. Where the term "moiety" is used to describe a chemical compound or substituent, only an unsubstituted chemical material is intended to be included. For example, the phrase "alkyl group" is intended to include not only pure open-chain and cyclic saturated hydrocarbon alkyl substituents, such as methyl, ethyl, propyl, t-butyl, cyclohexyl, adamantyl, octadecyl, and the like, but also alkyl substituents bearing further substituents known in the art, such as hydroxyl, alkoxy, vinyl, phenyl, halogen atoms (F, Cl, Br, and I), cyano, nitro, carboxyl, etc. On the other hand, the phrase "alkyl moiety" is limited to the inclusion of only pure open-chain and cyclic saturated hydrocarbon alkyl substituents, such as methyl, ethyl, propyl, t-butyl, cyclohexyl, adamantyl, octadecyl, and the like. Substituents which react with active ingredients, such as very strongly electrophilic or oxidizing substituents, would of course be excluded by the ordinary skilled artisan as not being inert or harmless.

In addition to being used as a release layer for a photoconductor construction, the release polymer of this invention may advantageously be used as a coating on any substrate where there is a desire for good release properties, abrasion resistance, and resistance to liquid toners and similar solvents, materials or solutions. For example, in one preferred embodiment of the present invention, a drying element in an electrophotographic system, as described herein.

DETAILED DESCRIPTION OF THE INVENTION

The photoconductor construction of this invention preferably comprises an electroconductive substrate that supports at least a photoconductor layer and a release layer. The photoconductors of this invention may be of a drum type construction, such as an amorphous silicon drum, a belt construction, or any other construction known in the art.

Electroconductive substrates for photoconductive systems are well known in the art and are generally of two general classes: (a) self-supporting layers or blocks of conducting metals, or other highly conducting materials; (b) insulating materials such as polymer sheets, glass, or paper, to which a thin conductive coating, e.g. vapor coated aluminum, has been applied.

Figure 1A:
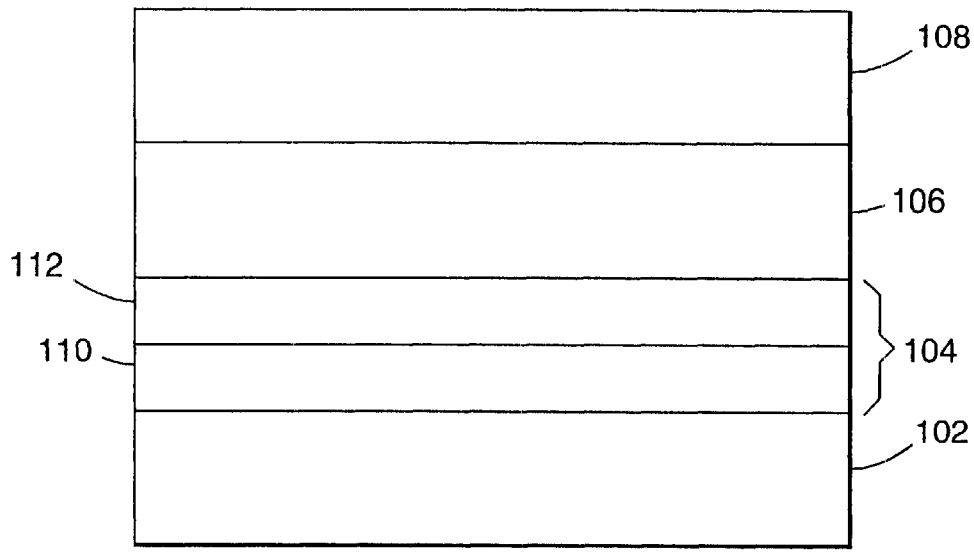
FIG. 1a and 1b are each a schematic illustration of an embodiment of a hotoreceptor element in accordance with the present invention.

Referring to FIG. 1a, one embodiment of an organic photoreceptor 10 in accordance with the present invention preferably includes a conductive substrate 102, a photoconductive element 104, a barrier layer 106, and a release layer 108. Preferably, the photoconductive element 104 is a bilayer construction featuring a charge generating layer 110 and a separate charge transport layer 112. The charge generating layer 110 may be located intermediate the conductive substrate 102 and the charge transport layer 112, as shown in FIG. 1a. Alternatively, the photoconductive element may be an inverted construction in which the charge transport layer is intermediate the conductive substrate and the charge generating layer. As stated above, the photoreceptor may be in the form of a plate, drum, or belt.

Figure 1B:
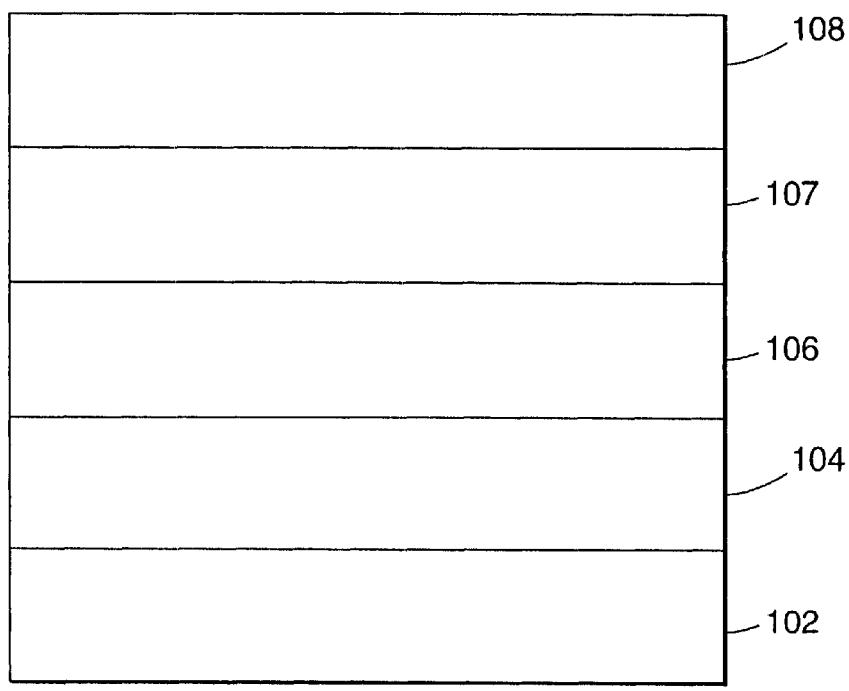

Referring to FIG. 1b, another embodiment in accordance with the present invention is shown, wherein an organic photoreceptor 10' includes a conductive substrate 102, a photoconductive element 104, a barrier layer 106, a tie layer 107, and a release layer 108.

Photoconductive element

As mentioned above, a photoconductive element preferably includes a charge generating layer and a charge transport layer. Generally, the charge generating layer includes a charge generating compound dispersed within a binder. The charge generating compound is a material that is capable of absorbing light to generate charge carriers, such as a dyestuff or pigment. Examples of suitable compounds are well known and include metal-free phthalocyanine pigments (e.g., Progen 1 x-form metal-free phthalocyanine pigment from Zeneca, Inc.). Also suitable are Y-form metal-free phthalocyanine pigments.

Charge transport compounds suitable for use in the charge transport layer of the photoconductors of the present invention should be capable of supporting the injection of photogenerated holes or electrons from the charge generation layer (depending upon the charging polarity) and allowing the transport of these holes or electrons through the charge transport layer to selectively discharge the surface charge. Preferable hole transport compounds comprise aromatic amines, hydrazone compounds, oxadiazole compounds, oxazole compounds, pyrazoline compounds, triphenyldiamine compounds, and triarylmethane compounds. Particularly preferred transport materials are described in U.S. patent application Ser. No. 09/172,379, filed Oct. 14, 1998, entitled "Organophotoreceptors for Electrophotography Featuring Novel Charge Transport Compounds" (Mott et al.). Polymeric charge transport materials such as polyvinyl carbazole may also be used. Additional materials are disclosed in Borsenberger and Weiss, "Photoreceptors: Organic Photoconductors," Ch. 9, Handbook of Imaging Materials, Ed. Arthur S. Diamond, Marcel Dekker, Inc., 1991.

The charge transport compound may act as a binder. It is also possible to combine the charge transport compound and/or the charge generating compound with a separate polymeric binder. Examples of suitable binders include styrenebutadiene copolymers, modified acrylic polymers, vinyl acetate polymers, styrene-alkyd resins, soya-alkyl resins, polyvinyl butyral, polyvinylchloride, polyvinylidene chloride, acrylonitrile, polycarbonate, polyacrylic and methacrylic esters, polystyrene, polyesters, and combinations thereof. Examples of suitable polycarbonate binders include aryl polycarbonates, such as aryl polycarbonates including poly(4,4-dihydroxy-diphenyl-1,1-cyclohexane) ("Polycarbonate Z 200; Z 300; Z 400; Z 800," all available from Mitsubishi Engineering Plastics, White Plains, N.Y.) and poly(Bisphenol A carbonate-co-4,4'(3,3,5-trimethyl cyclohexylidene) diphenol.

A particularly useful binder is polyvinyl butyral. This material has free hydroxyl groups available for reaction, e.g., with isocyanate groups which may be present in the charge transport layer, the charge generating layer, additional layers, or a combination thereof.

Release Layer

A release layer of the present invention includes (a) a silicone polymer with a high content of ethylenically unsaturated pendant groups polymer selected from the group consisting of

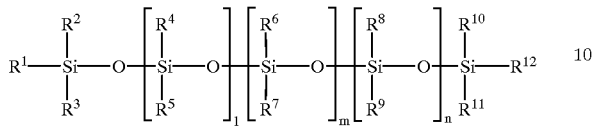

wherein $R^1$, $R^2$, $R^3$, $R^6$, $R^7$, $R^{10}$, $R^{11}$, and $R^{12}$ are each independently selected from an alkyl group (preferably having from 1 to 5 carbon atoms), an alkenyl group, an aryl group (preferably a phenyl group), and an aralkyl group, such that at least one of $R^6$ and $R^7$ is an alkenyl group, preferably a vinyl group, $R^4$, $R^5$, $R^8$, and $R^9$ are each independently selected from an alkyl group, an aryl group, and an aralkyl group, and l, m, and n are each independently an integer so long as the polymer contains greater than 3 mol % vinyl-containing siloxane groups; a (vinyl siloxy)(siloxy)-modified silica having a vinyl content of at least about 0.4 vinyl equivalent/kg; and a combination thereof.

Preferred polymers in part (a) are referred to herein as "high vinyl-containing polymers" and include materials having greater than 3 mol %, preferably greater than 7 mol %, and preferably less than about 20 mol %, and even more preferably between 7 mol % and 15 mol % vinyl-containing siloxane groups. Typically the high vinyl-containing polymers have a viscosity range of from 400 to 1,000,000 centiStokes (cSt), preferably from 800 to 500,000 cSt.

Preferably, the high vinyl-containing polymer includes $R^1$, $R^2$, $R^3$, $R^6$, $R^7$, $R^{10}$, $R^{11}$, and $R^{12}$ that are each independently selected from an alkyl group, preferably having from 1 to 5 carbon atoms, wherein at least one of $R^6$ and $R^7$ is an alkenyl group, preferably a vinyl group having from 1 to 5 carbon atoms and the other of $R^6$ and $R^7$ is preferably a methyl group.

Preferably, the alkyl group of $R^{13}$, $R^{14}$, $R^{15}$, $R^{18}$, $R^{19}$, $R^{22}$, $R^{23}$, and $R^{24}$ has from 1 to 5 carbon atoms and, more preferably, is a methyl group. Preferably, the alkenyl group of $R^{13}$, $R^{14}$, $R^{15}$, $R^{18}$, $R^{19}$, $R^{23}$, and $R^{24}$ has from 2 to 10 carbon atoms and is preferably a vinyl-containing group. Additionally, the at least two alkenyl groups of $R^{13}$, $R^{14}$, $R^{15}$, $R^{18}$, $R^{19}$, $R_{22}$, $R_{23}$, and $R^{24}$ can be the same or different alkenyl group. Preferably, the alkyl group of $R^{16}$, $R^{17}$, $R^{20}$, and $R^{21}$ has from 1 to 5 carbon atoms and, more preferably, is a methyl group. Commercially available examples of a high vinyl-containing polymer of part (a) include those commercially available under the trade designations PS 422, PS 424, and PS 426 (all from Huls America Inc.), KE-79 (from Shin Etsu Chemical Co. Ltd.), and VDT-731 and VDT-954 (both from Gelest Inc., Tullytown, Pa.).

In another preferred class, high vinyl-containing polymers include materials having a vinyl content of at least about 0.4 and preferably to about 1.2 vinyl equivalents/kg. In one embodiment, preferably, the (vinyl siloxy)(siloxy)-modified silica is a vinyl Q resin and, more preferably, it is a polymer having the formula

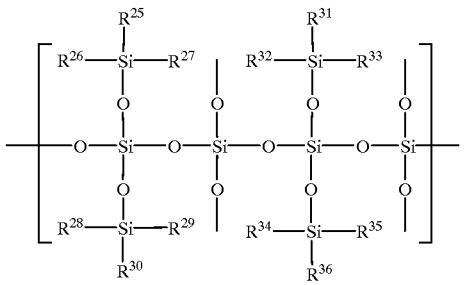

wherein $R^{25}$, $R^{26}$, $R^{27}$, $R^{28}$, $R^{29}$, $R^{30}$, $R^{31}$, $R^{32}$, $R^{33}$, $R^{34}$, $R^{35}$, and $R^{36}$ are each independently selected from an alkyl group (preferably having from 1 to 5 carbon atoms), an alkenyl group (preferably having from 2 to 10 carbon atoms), an aryl group (preferably a phenyl group), and an aralkyl group, wherein at least one alkenyl group, preferably a vinyl-containing group, is present in each of —$OSiR^{25}R^{26}R^{27}$; —$OSiR^{28}R^{29}R^{30}$; —$OSiR^{31}R^{32}R^{33}$; and —$OSiR^{34}R^{35}R^{36}$ so long as the polymer has a vinyl content of at least about 0.4 vinyl equivalent/kg.

One preferred vinyl Q resin is a (methylvinylsiloxy), trimethylsiloxy modified silica, commercially available under the trade designation VQX-221, from Gelest, Inc., Tullytown, Pa. Other preferred vinyl Q resins are commercially available under the trade designations VQM-135 and VQM-146, both from Gelest Inc., Tullytown, Pa.

Preferably, the release composition of the present invention comprises from about 0 to about 30 parts, more preferably 5 to 20 parts and, even more preferably, 10 to 16 parts by weight of the high vinyl-containing silicone polymer.

In addition to the high vinyl-containing silicone polymer of part (a) described above, a release composition of the present invention also includes (b) a polymer of the formula

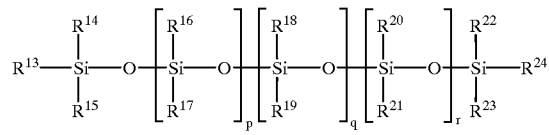

wherein $R^{13}$, $R^{14}$, $R^{15}$, $R^{18}$, $R^{19}$, $R^{22}$, $R^{23}$, and $R^{24}$ are each independently selected from an alkyl group, an alkenyl group, an aryl group, and an aralkyl group, such that at least two of $R^{13}$, $R^{14}$, $R^{15}$, $R^{18}$, $R^{19}$, $R^{22}$, $R^{23}$, and $R^{24}$ is an alkenyl group, $R^{16}$, $R^{17}$, $R^{20}$, and $R^{21}$ are each independently selected from an alkyl group, an aryl group, and an aralkyl group, p, q, and r are each independently integers so long as the polymer has less than 3 mol % vinyl-containing siloxane groups.

The polymers in part (b) are referred to herein as "low vinyl-containing polymers" and include materials having less than 3 mol %, preferably less than 2 mol % and, more preferably, less than 0.5 mol % vinyl-containing siloxane groups. Typically, the polymers in part (b) are relatively high viscosity materials such that they may even be solid at ambient temperature.

Commercially available examples of a low vinyl-containing polymer of part (b) include those available under the trade designations PS 255 (Huls America Inc.), C158, C157, C162, C170, and C566 (all from Wacker Silicones Corp.), KE-76 and KE-78 (both from Shin Etsu Chemical Co. Ltd.), SE 33 (from GE Silicone), and DMS-V52 and DMS-V41 (both from Gelest Inc., Tullytown, Pa.).

Preferably, the release composition of the present invention comprises from about 20 to about 100 parts, more preferably 30 to 90 parts and, even more preferably, 60 to 80 parts by weight of the low vinyl-containing silicone polymer.

A release composition in accordance with the present invention also includes (c) a cross-linking agent of the formula

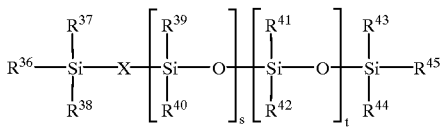

wherein $R^{36}$, $R^{37}$, $R^{38}$, $R^{43}$, $R^{44}$, and $R^{45}$ are each independently selected from hydrogen, an alkyl group, an alkenyl group, an aryl group, and an aralkyl group, $R^{39}$, $R^{40}$, $R^{41}$, and $R^{42}$ are each independently selected from hydrogen, an alkyl group, an aryl group, or an alkenyl group, X is O, or a divalent organic linking group, and s and t are independently integers so long as there are at least two functional groups capable of cross-linking per molecule.

Preferred cross-linking agents of part (c) include materials wherein $R^{36}$, $R^{37}$, $R^{38}$, $R^{43}$, $R^{44}$, and $R^{45}$ are each independently an alkyl group having preferably from 1 to 10 carbon atoms, and more preferably are methyl groups. Preferably, s and t are integers so long as there are at least two functional groups capable of cross-linking per molecule resulting in a hydrogen content of greater than 10 mol %, wherein at least two of $R^{39}$, $R^{40}$, $R^{41}$, and $R^{42}$ are hydrogen so long as two hydrogen atoms are not attached to the same silicon atom, with the proviso that when t is 0, then one of $R^{39}$ or $R^{40}$ is hydrogen.

Preferably, the cross-linking agent of part (c) is present in an amount up to about 20, preferably about 5 to about 15, and more preferably about 8 to about 12, parts by weight.

Commercially available examples of a cross-linking agent of part (c) include those commercially available under the trade designations SYL-OFF 7048 and 7678 (from Dow Corning, Midland, Mich.), SYLGARD 186 (from Dow Corning, Midland, Mich.), NM203, PS 122.5 and PS 123 (from Huls America Inc., F-9W-9 (Shin Etsu Chemical Co. Ltd.) and VXL (O Si Specialties).

The above components are preferably reacted in the presence of a catalyst capable of catalyzing addition crosslinking of the above components to form a release coating composition. Suitable catalysts include the transition metal catalysts described for hydrosilylation in The Chemistry of Organic Silicone Compounds, Ojima, (S. Patai, J. Rappaport eds., John Wiley and Sons, New York 1989). Such catalysts may be either heat or radiation activated. Examples include, but are not limited to, alkene complexes of Pt(II), phosphine complexes of Pt(I) and Pt(0), and organic complexes of Rh(I). Choroplatinic acid based catalysts are the preferred catalysts. Inhibitors may be added as necessary or desired in order to extend the pot life and control the reaction rate. Commercially available hydrosilation catalysts based on chloroplatinic acid include those available under the trade designations: PC 075, PC 085 (Huls America Inc.), SYLOFF 7127, SYLOFF 7057, SYLOFF 4000 (all from Dow Corning Corp.), SL 6010-D1 (General Electric), VCAT-RT, VCAT-ET (O Si Specialties), and PL-4 and PL-8 (Shin Etsu Chemical Co. Ltd.).

A release layer may optionally contain inorganic particles. One preferred type of inorganic particles includes fumed, precipitated, or finely divided silicas. Preferred silicas. More preferred inorganic particles include colloidal silicas commercially available under the trade designations CAB-O-SIL (from Cabot Corp., Tuscola, Ill.) and AEROSIL (from Degussa). Even more preferred inorganic particles are low surface energy inorganic particles such as surface treated colloidal silica, such as those commercially available under the trade designations CAB-O-SIL TS-530 and TS-720, both from Cabot Corp. If present, the inorganic particles are present in the release layer in an amount up to about 20 weight %, more preferably from about 0.05 to about 15 weight % and, even more preferably, from about 0.1 to about 10 weight %, based on total weight of the release layer.

A release layer formed from a release composition described above is mechanically durable and very resistant to hydrocarbons that typically serve as toner carrier liquids. In general, the thickness of the release layer is greater than 0.3 µm, however, the maximum thickness is dependent on the substrate to which it is applied. For example, in a photoconductor, the thickness is preferably in the range of 0.4 to 3 µm, more preferably 0.5 to 1 µm.

Barrier Layer

Barrier layers included in photoreceptors are well known, and typically possess one or more of the following performance characteristics: (a) providing sufficient protection to the organic photoreceptor from damage due to corona-induced charge injection; (b) substantially inert with respect to the organic photoconductive layer; (c) exhibiting sufficient resiliency to withstand compressional and tensional forces exerted on the belt as it passes through the system when the photoreceptor is utilized in an endless belt form; and (d) providing sufficient protection to limit or prevent a liquid toner from contacting the organic photoreceptor.

Preferably, the photoconductor element of the present invention further comprises a barrier layer between the photoconductor layer and the release layer. The barrier layer protects the photoconductor layer from the toner carrier liquid and other compounds which might damage the photoconductor. The barrier layer also protects the photoconductive layer from damage that could occur from charging the photoconductor element with a high voltage corona. The barrier layer, like the release layer, must not significantly interfere with the charge dissipation characteristics of the photoconductor element and must adhere well to the photoconductive layer and the release layer, preferably without the need for adhesives. The barrier layer may be any known barrier layer, such as a crosslinkable siloxanol-colloidal silica hybrid as disclosed in U.S. Pat. Nos. 4,439,509; 4,606,934; 4,595,602; and 4,923,775; a coating formed from a dispersion of hydroxylated silsesquioxane and colloidal silica in an alcohol medium as disclosed by U.S. Pat. No. 4,565,760; or a polymer resulting from a mixture of polyvinyl alcohol with methylvinylether/maleic anhydride copolymer. Preferably the barrier layer is a composite which includes silica and an organic polymer selected from the group consisting of polyacrylates, polyurethanes, polyvinyl acetals, sulfonated polyesters, and mixtures of polyvinyl alcohol with methylvinylether/maleic anhydride copolymer. The organic polymer and silica are preferably present in the barrier layer at a silica to polymer weight ratio ranging from 9:1 to about 1:1. Barrier layers of this type are disclosed in U.S. Pat. No. 6,001,522 (Woo et al.). Another preferred barrier layer can be a composite material of an organic polymer with a silanol. The silanol has the formula $$Y_aSi(OH)_b$$

wherein:
- Y includes, for example, alkyl or alkoxy groups having from 1 to 6 carbon atoms; alkoxyalkyl groups in which the alkoxy portion contains from 1 to 2 carbon atoms and the alkyl portion contains from 1 to 6 carbon atoms; halogenated alkyl groups having from 1 to 6 carbon atoms and from 1 to 2 halogen substituents; aminoalkyl groups having from 1 to 6 carbon atoms and one amino group attached to either the 2, 3, 4, 5 or 6 carbon atom; a vinyl group; a phenyl group which may contain 1 to 2 halogen substituents; a cycloalkyl group having from 5 to 6 carbon atoms and which may contain 1 to 2 substituents; and hydrogen,
- a is a number ranging from 0–2,
- b is a number ranging from 2–4, and
- a plus b equals 4.

The organic polymer is preferably selected from the group consisting of polyacrylates, polyurethanes, polyvinyl acetals, sulfonated polyesters, and mixtures of polyvinyl alcohol with methylvinylether/maleic anhydride copolymer.

Yet another preferred barrier layer is preferably formed from a barrier layer coating composition that can include a cellulose resin, a methylvinyl ether/maleic anhydride copolymer, a polyamide, a crosslinking agent, and a combination thereof. Preferred barrier layer coating compositions are described in U.S. Pat. No. 6,180,305 B1 (Ackley et al.).

For example, in one preferred barrier layer, the cellulose resin is a selected from the group consisting of a modified cellulose, an unmodified cellulose, and a combination thereof. More preferably, the cellulose resin is selected from the group of methyl cellulose, ethyl cellulose, hydroxypropyl cellulose, a cellulose ester, and a combination thereof A preferred crosslinking agent is a bis aldehyde, preferably an aliphatic dialdehyde and, even more preferably, the cross-linking agent is glyoxyl, such as that commercially available under the trade designation GLYOXAL 40, from Aldrich Chemical, Milwaukee, Wis.

Preferably, the resin and the copolymer are present in a barrier coating composition in a ratio of about 0.4:1.0 to about 1.0:0.4 and, more preferably, the ratio of the resin to the copolymer is about 1:1 Preferably, the barrier layer coating composition includes the cellulosic resin in an amount from about 0.2% solids by weight to about 15.0% solids by weight, more preferably, in an amount of 0.6% solids by weight to about 2.5% solids by weight, and, even more preferably, in an amount of 0.75% solids by weight.

Preferably, the barrier layer coating composition includes the copolymer in an amount of about 1.2% solids by weight to about 0.3% solids by weight, more preferably, about 0.9% solids by weight to about 0.6% solids by weight, and, even more preferably, about 0.75% solids by weight.

The barrier layer coating composition preferably includes a ratio of the cellulosic resin to the copolymer of about 0.4:1.0 to about 1.0:0.4, more preferably, the ratio of the cellulosic resin to the copolymer is about 1:1. Thus, in one preferred embodiment, the barrier layer coating composition includes the cellulosic resin in an amount of about 0.75% solids by weight of the cellulose resin and the copolymer in an amount of about 0.75% solids by weight of the copolymer.

The crosslinking agent is preferably a bis aldehyde and, more preferably, the cross-linking agent is glyoxal. Preferably, the barrier layer coating composition includes the cross-linking agent in an amount from about 1.0% solids by weight to about 10.0% solids by weight, and, more preferably, from about 1.0% solids by weight to about 7.5% solids by weight of the sum amount of the resin and the copolymer in the barrier layer coating composition.

The barrier layer typically has a thickness of about 0.2 micrometers to about 1.0 micrometers and, more preferably, from about 0.4 micrometers to about 0.8 micrometers.

The barrier coating composition may also include at least one optional component, such as surfactants, plasticizers, anti-static agents, wetting agents, anti-foaming agents, conductive additives, and fillers, to name a few. One preferred optional component is a surfactant, preferably a nonionic surfactant, such as that commercially available under the trade designation TRITON X-100, from Aldrich Chemical, Milwaukee, Wis.

Another preferred optional component is silica particles. The silica particles preferably are colloidal silica having average diameter from 5 to 200 nm. As used herein, "colloidal silica" refers to a dispersion of silicon dioxide particles in which the silica particles can range in size from about 5 to about 30 nm. One suitable colloidal silica is commercially available under the trade designation SNO-TEX O, from Nissan Chemical Industries, Ltd., Tarrytown, N.J. Preferably, the colloidal silica is present in a barrier layer coating composition in an amount of less than about 20%, more preferably, less than about 15%, and even more preferably from about 12% to about 6% of total solids by weight of the sum of the resin and the copolymer in the barrier layer coating composition.

Suitable conductive additives include conductive pigments, conductive polymers, doped conductive polymer compositions, photoconductive organic molecules, and conductive pigments (or conductive particles) are preferred. The amount of conductive pigment is preferably less than 35% and, more preferably, less than about 20% by weight of the barrier layer.

Preferably, a barrier coating composition is applied to an organic photoconductor using any conventional coating technique, such as air doctor coating, blade coating, air knife coating, squeeze coating, reverse roll coating, transfer roll coating, gravure coating, kiss coating, cast coating, spray coating, dip coating, bar coating, extrusion coating, die coating, for example.

Tie layer

A photoreceptor in accordance with the present invention may have a structure including an organic photoconductor, a barrier layer, a tie layer, and a release layer (as described above). In one embodiment, the tie layer can be positioned between the barrier layer and the release layer to enhance adhesion of the release layer to the barrier layer in the organic photoreceptor. In another embodiment, the tie layer can be positioned between the charge generating layer and the barrier layer to enhance adhesion of the barrier layer to the organic photoconductor. One with ordinary skill in the art will readily appreciate that an organic photoreceptor according to the present invention may possess a variety of layered configurations, such as the presence of a tie layer between the release layer and the barrier layer as well as the presence of a tie layer between the charge generating layer and the barrier layer.

Preferably, a tie layer is formed from a tie layer coating composition comprising an organic polymer, as described in U.S. Pat. No. 6,180,305 B1 (Ackley et al.). Preferably, an organic polymer is selected from the group of polyetheramines, polyvinyl acetals, polyamides, methylvinyl ether/maleic anhydride copolymer, and combinations thereof Preferably, an organic polymer is present in a tie layer coating composition in an amount less than about 30%. solids in the tie layer coating composition.

One preferred type of organic polymer for use in a tie layer in accordance with the present invention is a polyetheramine having aromatic ether/amine repeating units in its backbone and pendant hydroxyl moieties. Namely, a suitable polyetheramine is preferably formed by reacting diglycidyl ethers of dihydric aromatic compounds (e.g., the diglycidyl ether of bisphenol-A, hydroquinone, or resorcinol) with amines, preferably having no more than two amine hydrogens per molecule (e.g., piperazine or ethanolamine), as is described in U.S. Pat. No. 5,275,853 (Silvis et al.). Preferred polyetheramines are commercially available under the trade designations XU 19073 and XU 19040, both from The Dow Chemical Company, Midland Mich.

Another preferred type of organic polymer for use in a tie layer in accordance with the present invention is a polyamide, such as those commonly known as nylon 6, nylon 66, and others known in the art. Suitable polyamide materials are commercially available under the trade designations ULTRAMID, from BASF Corporation, Mount Olive, N.J.; and AMILAN, from Toray Ltd., Japan. Preferably, the polyamide is included in a tie layer coating composition in an amount of less than about 10%, more preferably, less than about 7.5%, and even more preferably, less than about 5% by weight.

Yet another preferred type of organic polymer for use in a tie layer in accordance with the present invention is a mixture of a polyvinyl acetal, preferably polyvinyl butyral, with a methylvinyl ether/maleic anhydride copolymer, in which the ratio of polyvinyl acetal to methylvinyl ether/maleic anhydride copolymer is preferably from about 5:1 to about 15:1 and, more preferably, about 12:1. Preferably, the mixture of a polyvinyl acetal with methylvinyl ether/maleic anhydride copolymer is included in a tie layer coating composition in an amount of less than about 10%, more preferably, less than about 7.5%, and even more preferably, less than about 5% by weight. Optionally, a coupling agent can be included and is preferably selected from the group of glycidoxy-propyltrimethoxysilane, vinyltrimethyoxysilane, chloromethyltrimethoxysilane, methyltrimethoxysilane, and 3-aminopropyltriethoxysilane. If present, the coupling agent is typically present in an amount less than about 5% by weight of the tie layer coating composition.

A further preferred type of organic polymer for use in a tie layer in accordance with the present invention is a mixture of a polyvinyl acetal, preferably polyvinyl butyral, and a cross-linking agent, preferably, a bis aldehyde, more preferably, an aliphatic dialdehyde, and, even more preferably, glyoxal, such as that commercially available under the trade designation GLYOXAL 40, from Aldrich Chemical, Milwaukee, Wis. Preferably, the mixture of a polyvinyl acetal with a cross-linking agent is included in a tie layer coating composition in an amount of less than about 10%, more preferably, less than about 7.5%, and even more preferably, less than about 5% by weight.

Preferably, a tie layer coating composition also includes silica, preferably colloidal silica. Preferred colloidal silica compositions are commercially available under the trade designations SNOTEX O, from Nissan Chemical Industries, Ltd., Tarrytown, N.Y., and CABOSIL TS-720 from Cabot Corp., Tuscola, Ill. The tie layer coating composition preferably includes colloidal silica in an amount of about 0 to about 12% by weight.

In accordance with the present invention, a tie layer coating composition is applied to at least one surface on the organic photoconductor, such as on the surface of the charge generating layer, the surface of the barrier layer, or both. Regardless of the surface on which the tie layer coating composition is applied, the resulting tie layer preferably has a thickness of about 0.2 micrometer to about 0.7 micrometer.

Electrophotographic System

Organic photoreceptors described above are suitable for use in an imaging process with either dry or liquid toner development. Liquid toner development is generally preferred because it offers the advantages of providing higher resolution images and requiring lower energy for image fixing compared to dry toners. Examples of useful liquid toners are well known. They typically include a colorant, a resin binder, a charge director, and a carrier liquid. A preferred resin to pigment ratio is 2:1 to 10:1, more preferably 4:1 to 8:1. Typically, the colorant, resin, and the charge director form the toner particles.

Organic photoreceptors according to the invention are particularly useful in a compact electrophotographic imaging system where an organic photoreceptor in accordance with the present invention is wound around and supported by several rollers. A number of apparatus designs may be employed, including for example, the apparatus designs disclosed in U.S. Pat. Nos. 5,650,253 (Baker et al.); 5,659,851 (Moe et al.); and 5,916,718 (Kellie et al.).

Figure 2A:
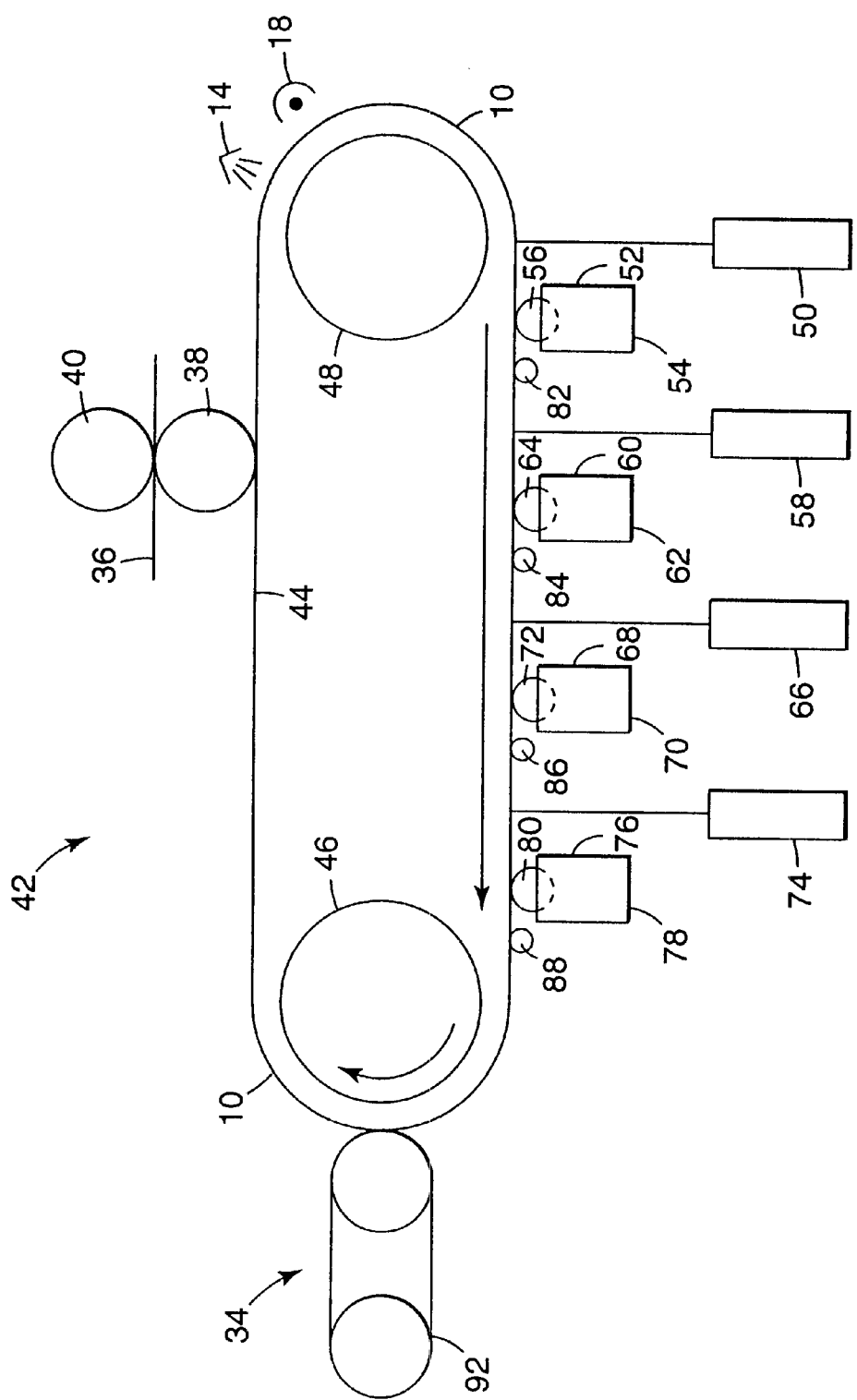
FIGS. 2a and 2b are schematic illustrations of electrophotographic systems, each including a photoreceptor element in accordance with the present invention, for producing multi-colored images.

FIG. 2a is a schematic illustration of one preferred embodiment of an electrophotographic system 42 and a method for producing a multi-colored image utilizing a photoreceptor element described above. A photoreceptor element 10, shown in the form of an endless belt, is mechanically supported by belt 44 that rotates, preferably in a clockwise direction, around rollers 46 and 48. The photoreceptor element 10 may be first conventionally erased with an erase lamp 14. Preferably, any residual charge left on the photoreceptor element 10 after the preceding cycle is removed by the erase lamp 14 and then conventionally charged using charging device 18 (e.g. a corona charging device), such procedures being well known in the art. When charged, a surface of the photoreceptor element 10 is preferably charged from about 550 volts to about 750 volts. A laser scanning device 50 exposes the charged surface of the photoreceptor element 10 to radiation in an image-wise pattern corresponding to a first color plane of the image to be reproduced. Suitable laser scanning devices are well known in the art.

Thereafter, charged pigment particles in a liquid ink 54, corresponding to the first color plane, will migrate to and plate upon the charged surface of the photoreceptor element 10 in areas where the surface voltage of the photoreceptor element 10 is less than the bias of electrode 56 associated with a liquid ink developer station 52. Charge neutrality of the liquid ink 54 is maintained by negatively charged counter ions that balance the positively charged pigment particles. The counter ions are deposited on the surface ofthe photoreceptor element 10 in areas where the surface voltage is greater than the bias voltage of the electrode 56, such as that described in U.S. Pat. No. 5,596,398 (Woo et al.), associated with the liquid ink developer station 52. One example of a suitable developer station is described in U.S.

Pat. No. 5,300,990 (Thompson et al.). Another developer apparatus is described in U.S. Pat. No. 5,758,236 (Teschendorf et al.).

At this stage, the photoreceptor element 10 includes, on its surface, an image-wise distribution of plated "solids" of liquid ink 54 in accordance with the first color plane. The surface charge distribution of the photoreceptor element 10 has also been recharged with plated ink particles as well as with transparent counter ions from the liquid ink 54, both being governed by the image-wise discharge of the photoreceptor element 10 due to laser scanning device 50. Thus, the surface charge of the photoreceptor element 10 is quite uniform. Although not all of the original surface charge of the photoreceptor element may have been obtained, a substantial portion of the previous surface charge of the photoreceptor element has been recaptured. With such solution recharging, the photoreceptor element 10 can be processed for the next color plane of the image to be reproduced.

Although not required, a "topping corona" (not illustrated) may be applied to photoreceptor 10 following the first three or, optionally all four, development stations 52, 60, 68, and 76. For example, while photoreceptor 10 recharges following development with liquid inks 54, 62 and 70, it typically does not recharge completely to the previously charged voltage. Thus, a conventional corona charging device may be employed following development stations 52, 60 and 68 to bring the voltage on photoreceptor 10 back to a preferred charging level. For example, following erasure by erase lamp 14, the surface of photoreceptor 10 is at a relatively low voltage level, typically around 100 volts. Following charging by a corona charging device (not shown), the surface of photoreceptor 10 is charged to a relatively high value suitable to development of a liquid ink, typically around 700 volts. Following image-wise exposure to radiation by laser scanning device 50, corresponding to a first color plane (preferably yellow), the areas of the surface of photoreceptor 10 are discharged to a discharged level of around 150 volts. Non-exposed areas of the surface of photoreceptor 10 remain at a highly charged level, around 700 volts. Following development by developer station 52, the surface of photoreceptor 10 is substantially uniformly charged to an intermediate level of around 500 volts. Discharged areas of photoreceptor 10 are developed "up" to 500 volts and non-discharged areas of photoreceptor 10 are developed "down" to 500 volts. Because this developed voltage will tend to decay over time, a topping corona is preferably used to bring the surface of photoreceptor 10 back up to the high level of around 700 volts.

As the belt 44 continues to rotate, the photoreceptor element 10 next is image-wise exposed to radiation from laser scanning device 58 corresponding to a second color plane. Significantly, this process occurs during a single revolution of the photoreceptor element by the belt 44 and without erasing the photoreceptor element 10 subsequent to exposure to the laser scanning device 58 and the second liquid ink development station 60 corresponding to the first color plane. The remaining charge on the surface of the photoreceptor element 10 is subjected to radiation corresponding to a second color plane. This produces an image-wise distribution of the surface charge on the photoreceptor element 10 corresponding to the second color plane of the image.

The second color plane of the image is then developed by a developer station 60 containing a liquid ink 62. The liquid ink 62 preferably contains "solid" color pigments consistent with the second color plane and substantially transparent counter ions that, although they may have differing chemical compositions than the substantially transparent counter ions of the liquid ink 54, they are still substantially transparent and oppositely charged to the "solid" color pigments. The electrode 64 provides a bias voltage to allow "solid" color pigments of the liquid ink 62 to create a pattern of "solid" color pigments on the surface of the photoreceptor element 10 corresponding to the second color plane. The transparent counter ions also substantially recharge the photoreceptor element 10 and make the surface of the photoreceptor element 10 substantially uniform so that another color plane may be placed upon the photoreceptor element 10 without erasing or corona discharging.

A third color plane of the image to be reproduced is deposited on the surface of the photoreceptor element 10 in a similar fashion using a laser scanning device 66 and a developer station 68 containing a liquid ink 70 using an electrode 72. Again, the surface voltage of the photoreceptor element 10 may be somewhat less than existed prior to exposure to the laser scanning device 66 but will be substantially "recharged" and will be quite uniform allowing application of the fourth color plane without erasing or corona discharging.

Similarly, a fourth color plane is deposited upon the photoreceptor element 10 using a laser scanning device 74 and a developer station 76 containing a liquid ink 78 using an electrode 80.

Preferably, excess ink from the liquid inks 54, 62, 70, and 78 is "squeezed" off using a roller that may be used in conjunction with one or more of the developer stations 52, 60, 68, and 76, (shown as rollers 82, 84, 86, and 88, respectively, as described in U.S. Pat. No. 5,754,928 (Moe et al.)) to form plated solids from each of the liquid inks. The plated solids on the photoreceptor are then dried using a drying mechanism 34 to form a completed dry four color image. The drying mechanism 34 may utilize air blowers or may be other active devices such as drying rollers, drying belts, vacuum devices, coronas, etc. One suitable drying mechanism is described in U.S. Pat. No. 5,420,675 (Thompson et al.). As shown in FIG. 2*a*, another suitable drying mechanism 34 is one that includes a drying belt 92. The drying belt 92 absorbs carrier liquid from the photoconductor element 10 to dry the developer applied by the developer stations 52, 60, 68, and 76. In accordance with the present invention, a drying belt, if employed, can include a release layer thereon that is formed from a composition in accordance with the present invention including a silicone polymer as described above.

Figure 2B:
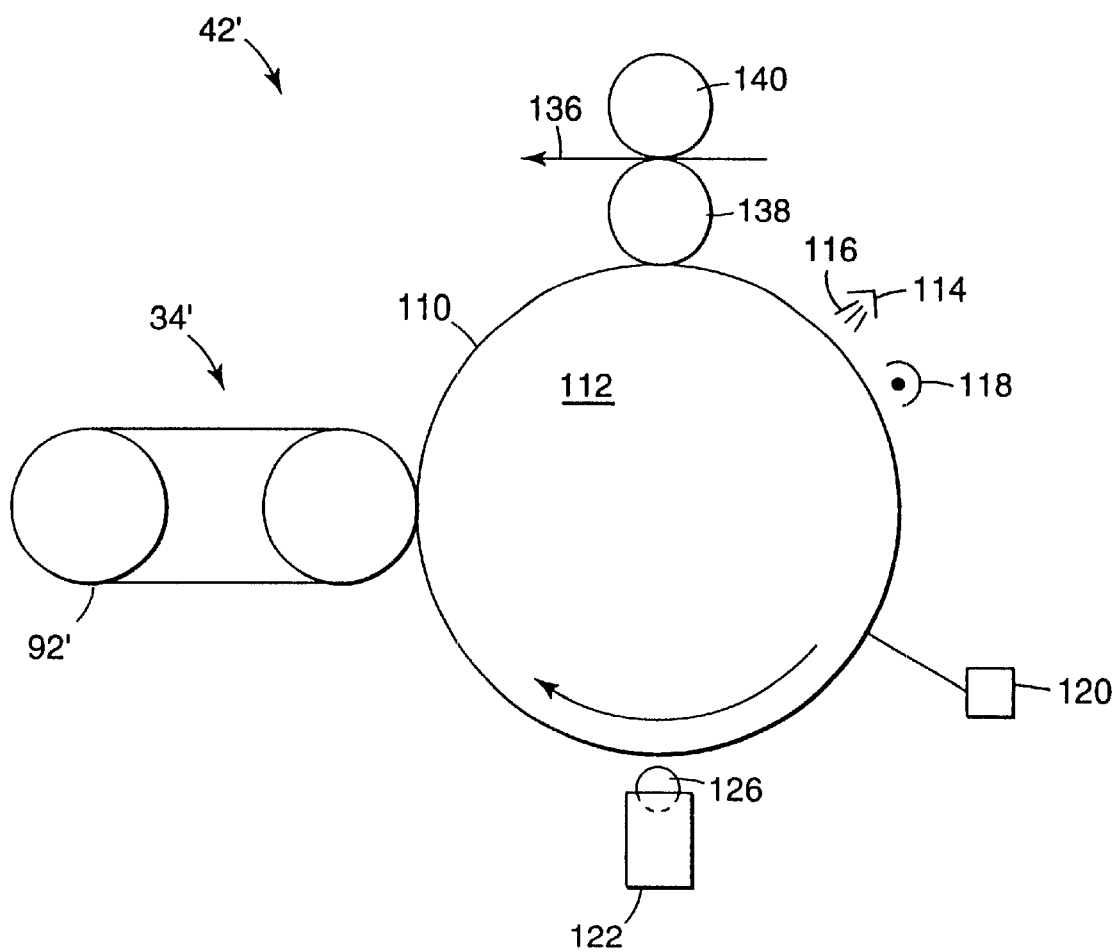

In an alternative embodiment of the present invention, FIG. 2*b* schematically illustrates an electrophotographic system 42', wherein as a drum 112 rotates, a photoreceptor element 110 moves past an erase lamp 114. When the photoreceptor element 110 passes under the erase lamp 114, radiation 116 from the erase lamp 114 impinges on the surface of the photoreceptor element 110 causing any residual charge remaining on the surface to "bleed" away. Thus, the surface charge distribution of the surface of the photoreceptor element 110 as it exits the erase lamp 114 is quite uniform and nearly zero depending upon the photoreceptor.

As the drum 112 continues to rotate and the photoreceptor element 110 next passes under a charging device 118, such as a roll corona, a uniform positive or negative charge is imposed upon the surface of the photoreceptor element 110. In a preferred embodiment, the charging device 118 can be a positive DC corona. Typically, the surface of the photoreceptor element 110 is uniformly charged to around 600 volts depending on the capacitance of photoreceptor. This prepares the surface of the photoreceptor element 110 for an image-wise exposure to radiation by a laser scanning device 120 as the drum 112 continues to rotate. Wherever radiation from the laser scanning device 120 impinges on the surface of the photoreceptor element 110, the surface charge of the photoreceptor element 110 is reduced significantly while areas on the surface of the photoreceptor element 110 which do not receive radiation are not appreciably discharged. Areas of the surface of the photoreceptor element 110 that receive some radiation are discharged to a degree that corresponds to the amount of radiation received. Typically, this results in the surface of the photoreceptor element 110 having a surface charge distribution which is proportional to the desired image information imparted by the laser scanning device 120 when the surface of the photoreceptor element 110 exits from under the laser scanning device 120.

As the drum 112 continues to rotate, the surface of the photoreceptor element 110 passes by a liquid ink developer station 122. A liquid ink is applied to the surface of the image-wise charged photoreceptor element 110 in the presence of an electric field that is established by placing an electrode 126, illustrated as a roller, near the surface of the photoreceptor element 110 and imposing a bias voltage on the electrode 126. As described with respect to FIG. 2a, the "solid" material in the ink, under force from the established electric field, migrates to and plates upon the surface of the photoreceptor element 110 in areas where the surface voltage is less than the bias voltage of the electrode 126. The "solid" material in the ink will migrate to and plate upon the electrode in areas where surface voltage of the photoreceptor element 110 is greater than the bias voltage of the electrode 126. Excess liquid ink not sufficiently plated to either the surface of the photoreceptor element 110 or to the electrode 126 is removed.

The ink is dried by drying mechanism that may include a roll, belt, vacuum box or curing station. As illustrated herein, the drying mechanism 34' includes a drying belt 92' that may include a release layer as described herein. Drying mechanism 34' substantially transforms liquid ink 124 into a substantially dry ink film. The ink film of liquid ink plated upon the surface of the photoreceptor element 110 matches the previous image-wise charge distribution previously place upon the surface of the photoreceptor element 10 by the laser scanning device 120 and, hence, is an image-wise representation of the desired image to be printed.

It is to be recognized and understood that the components described with respect to FIG. 2a and 2b are generally well known inthe art of electrophotography and the exact material and construction of these components is a matter of design choice which is also well understood in the art.

The dry color image generated by the system shown in FIGS. 2a or 2b is then preferably transferred, either directly to a medium 36 to be printed, or more preferably, indirectly by way of transfer mechanism 39, as shown in FIGS. 2a and 2b. Typically, heat and/or pressure are used to fix the image to the medium 36. Although the transfer mechanism 39 can take a variety of forms, one suitable transfer mechanism includes transfer rollers 38 and 40 and is described in U.S. Pat. No. 5,650,253 (Baker et al.).

With proper selection of charging voltages and liquid inks, the process may be repeated an indeterminate number of times to produce a multi-colored image having an indeterminate number of color planes. Although the process and apparatus has been described in connection with four color images, one skilled in the art will appreciate that the present invention is suitable for multi-color images having two or more color planes.

For example, it is possible to make prints containing many colors rather than one single color. The basic liquid electrophotography process and apparatus described in FIGS. 2a and 2b can be used by repeating the process described above for one color, a number of times wherein each repetition may image-wise expose a separate primary color plane, e.g., cyan, magenta, yellow or black, and each liquid ink may be of a separate primary printing color corresponding to the image-wise exposed color plane. Superposition of four such color planes may be achieved with good registration onto the surface of the photoreceptor element without transferring any of the color planes until all have been formed. Subsequent simultaneous transfer of all of these four-color planes to a suitable medium 36 may yield a quality color print. Such as process and apparatus is described in U.S. Pat. No. 4,728,983 (Zwadlo et al.).

The following examples are illustrative of specific embodiments and/or methods according to the present invention. A wide variety of variations from the following examples are within the scope of the present invention and are only to be limited by the appended claims.

EXAMPLES

The photoconductors of these Examples were tested according to the following procedures:

Swell Test

Release coating formulations at 5–10% solids in heptane were placed in aluminum weighing parts covered with TEFLON tape. The solvent was allowed to evaporate overnight in a vented hood before the sample was heated in an oven at 150° C. for 10 minutes. The dried, cured release materials were removed from the parts, weighed to determine the unswollen weight, and then soaked in NORPAR 12 brand solvent for 24 hours. After removal from the solvent, the release materials were patted dry and weighed. The % swell is the weight after soaking minus the unswollen weight divided by the unswollen weight.

Peel Force

Slip/peel tester model SP-102B-3M90 from Instrumentors, Inc., Hingham, Mass., was utilized for tape peel force measurements per the manufacturer's instructions. The 1.25 inch×4 inch (3.175 cm×10.16 cm) sample strips were each affixed to the working platen with double stick tape. Masking tape, commercially available from Minnesota Mining and Manufacturing Company, St. Paul, Minn. under the designation 202 (1 inch (2.54 cm) wide), was applied to the sample release surface or ink surface electroplated on a release surface (see below) and a 15 lb. (6.8 kg) roller was rolled over the tape 6 times. Immediately after adhering the tape, an MB-10 load cell from the slip/peel tester from Instrumentors was used to measure the average force (g/2.54 cm) required to peel the tape or the tape/ink combination off the surface at 180° and 90 inches/min (228.6 cm/min) for 2 seconds.

Tensile Strength and Percent Elongation

The tensile strength and percent elongation (strain) of release samples were measured by using INSTRON M-12 Tensometer, from Instron, Canton, Mass. Each sample was first prepared by pouring a 10% solution of the release coating composition in to a TEFLON mold that was then placed on a level surface, followed by air-drying the solvent in a hood, and curing the sample in an oven at 150° C. for 10 minutes. The cured sample was then released from the mold, cut into 5 mm wide strips, and placed into the grips of the tensometer which were spaced 30 mm apart. The sample was then stretched at a constant speed of between 100 to 400 mm/min until the dried release material broke. The maximum tensile stress and strain (% elongation) of the tested sample was recorded.

Materials

The following materials are utilized in the Examples herein.

CAB-O-SIL TS-720 is a hydrophobic treated silica commercially available from the Cab-O-Sil division of Cabot Corp., Tuscola, Ill.

CA-6 is a platinum-based catalyst commercially available from GE Silicones, Waterford, N.Y.

FBA is a 70:30 mixture by weight of diethylfumarate and benzyl alcohol.

Norpar-12 is a normal paraffinic liquid hydrocarbon commercially available from Exxon Corp., Houston Tex.

SE-33 is a high molecular weight, linear polydimethylvinylsiloxane gum having 0.1–0.4 mol % pendant vinyl groups, substantially free ofterminal vinyl groups and commercially available from GE Silicones, Waterford, N.Y.

SYLGARD 186 cross-linking agent is a mixture of approximately 86% dimethylvinyl-terminated poly dimethylsiloxane and approximately 13% copolymer containing dimethylsiloxane and methylhydrosiloxane groups having a viscosity of about 65,000 cP and commercially available from Dow Corning, Midland, Mich.;

SYL-OFF 4000 is a platinum-based catalyst commercially available from Dow Corning, Midland, Mich.

SYL-OFF 7048 is a polysiloxane cross-linking agent having poly methyl-hydrosiloxane groups commercially available from Dow Corning, Midland, Mich.

SYL-OFF 7678 is a polysiloxane cross-linking agent having about 50% methylhydrosiloxane groups and about 50% dimethylsiloxane groups commercially available from Dow Corning, Midland, Mich.

TUFEL 94506 is a high performance, high surface energy, silicone elastomer containing dimethylsiloxy groups, methylvinyl siloxy groups, and vinylsiloxy groups commercially available from GE Silicones, Waterford, N.Y.

VDT-731 is a trimethylsiloxy terminated poly (vinylmethylsiloxane) polymer containing 7–8 mol % vinylmethylsiloxane and having a viscosity of 800–1,200 cSt believed to have a molecular weight of about 28,000 and is commercially available from Gelest Inc., Tullytown, Pa.

VDT-954 is a trimethylsiloxy terminated poly (vinylmethylsiloxane) polymer containing 11–13 mol % vinylmethylsiloxane and having a viscosity of 300,000–500,000 cSt believed to have a molecular weight of about 230,000 and is commercially available from Gelest Inc., Tullytown, Pa.

VQM-135 has a vinyl eq./kg of 0.2–0.3 and is a less than 30% dispersion of a vinyl Q resin commercially available from Gelest Inc., Tullytown, Pa.

VQM-146 has a vinyl eq./kg of 0.18–0.23 and is a 20–25% dispersion of a vinyl Q resin commercially available from Gelest Inc., Tullytown, Pa.

VQX-221 has a vinyl eq/Kg of 0.4–0.6 and is a 50% dispersion in xylene commercially available from Gelest Inc., Tullytown, Pa.

DMS-V52 is a vinyl terminated polydimethylsiloxane having a vinyl eq/Kg of 0.013–0.016 commercially available from Gelest Inc., Tullytown, Pa.

DMS-V41 is a vinyl terminated polydimethylsiloxane having a vinyl eq/Kg of 0.03–0.04 available from Gelest Inc., Tullytown, Pa.

For each of the following Examples and Comparative Examples, the following construction was utilized.

Organic Photoconductor:

An inverted dual layer photoconductor (herein, "OPC") was prepared utilizing compound (2) as described in U.S. patent application Ser. No. 09/172,379, filed Oct. 14, 1998, entitled "Organophotoreceptors for Electrophotography Featuring Novel Charge Transport Compounds" (Mott et al.) The OPC included a polyester layer, an aluminum layer, a PET layer (formed from a resin commercially available under the trade designation VITEL PE 2200, from Bostik Chemicals, Middleton, Mass., at a 4.4% solids in a 2:1 MEK:toluene mixture, coated at a thickness of 0.2 micrometers using a slot die coater with a web speed of 3.048 meters/min., dried in 4 oven zones of 110° C., 120° C., 140° C., and 150° C.), a charge transport layer, and a charge generating layer.

Barrier Layer:

A barrier layer located on the OPC was utilized in all examples herein and was formed from a barrier layer coating composition as described in U.S. Pat. No. 6,180,305 B1 (Ackley et al.). Namely, a 3% stock solution of methyl cellulose, commercially available under the trade designation METHOCEL A15LV, from Dow Chemical, Midland, Mich., was made in water. The water was heated to about 90° C. The methyl cellulose powder was then added under agitation. The solution was then cooled to about 4° C. using an ice bath, and agitated using an air mixer for about 20 minutes at 4° C. The solution was then allowed to sit and reach ambient temperature.

A 3% stock solution of methylvinylether/maleic anhydride copolymer, commercially available under the trade designation GANTREZ AN-169, from ISP Chemical, Wayne, N.J., was made in water. The water was brought up to about 90° C., then the copolymer was added under agitation. The solution was agitated at 90° C. until the solution became clear. This took about 40 minutes.

A ratio of 1:1, by weight, of each stock solution was combined in an empty container. A nonionic surfactant, commercially available under the trade designation TRITON X100, from Aldrich Chemical, Milwaukee, Wis., was then added in an amount of 0.2 g/100 g of water. The solution was then diluted with methanol. A dialdehyde cross-linker, commercially available under the trade designation GLYOXAL 40, from Aldrich Chemical, Milwaukee, Wis., was then added in an amount of 5% by weight.

The barrier layer coating composition described above was at a thickness of 0.2 micrometers using a slot die coater with a web speed of 3.048 meters/min., dried in 4 oven zones set at 110° C., 120° C., 140° C., and 150° C. to dry the barrier layer coating composition, forming the barrier layer.

Tie Layer:

A tie layer was utilized in all examples herein and was positioned between the barrier layer and the release layer. The tie layer was formed from a tie layer coating composition including 3.1% poly(hydroxy amino ether) commercially available under the trade designation XUR, from Dow Chemical, Midland Mich., 58.1% tetrahydrofuran, and 38.8% 1-methoxy2-propanol, as described in U.S. Pat. No. 6,180,305 B1 (Ackley et al.).

The tie layer coating composition was coated on a substrate including a barrier layer with a 4 mil shim and a 5 micron filter at a web speed of 3.048 m/min. The coated OPC was passed through 4 oven zones set at 90° C., 100° C., 110° C., and 110° C. to dry the tie layer coating composition, forming the tie layer.

Example 1

A release coating composition in accordance with the present invention was prepared as two parts, part A, and part B. The two parts A and B were mixed just prior to coating to make the fully reactive system.

Part A: In a glass jar was added 149.73 parts of a 20% solids solution of SE 33 in heptane and 46.29 parts of a 20% solids solution of VDT-954 in heptane. To this mixture was then added 149.73 parts of a 20% solids solution of VQM-135 in heptane. To this mixture was then added 842.9 parts of heptane.

In a separate bottle, 0.81 parts of FBA and 100 parts of heptane were added. To the FBA solution was added 2.415 parts SYL-OFF 4000.

The inhibitor and catalyst mixture was then added to the solution described above. To the well mixed solution was then added 0.081 parts of CAB-O-SIL TS-720.

Part B: In another jar, 8.05 parts of SYL-OFF 7678 and 100 parts of heptane were added Parts A and B were mixed just prior to coating. To construct an organic-photoreceptor (OPR) belt, the release coating composition was coated and subsequently cured at 150° C. for 1.5 min on top of the inverted dual layer photoreceptor with a barrier layer and a tie layer, each as described above. The coating thickness of the release layer was 0.65 micrometer. Once the release layer was formed on the OPC, it is referred to herein as an OPR (organic photoreceptor).

The OPR was welded into a belt form and mounted into a mechanism having charge-discharge capabilities, an erase bar, and a steering mechanism designed to guide the OPR belt. An extended printing run was performed. A total of 8920 prints were produced. The release surface did not seem to be physically damaged (e.g. no sign of brittle fracture).

A different OPR belt of the same construction as described above was run again on the mechanism described above. This time, the mechanism operating procedure was changed to include spraying of a controlled amount of a solvent commercially available under the trade designation NORPAR-12, from Exxon Corp., Houston Tex., on the OPR surface, and occasional cleaning of the OPR surface. This time the OPR belt produced 20,050 prints, at which point the test was terminated.

The tensile property of this release coating composition was measured as described above. The tensile strength at break was 3.76 Mpa, and the elongation was 210 percent. The material was considered non-brittle and elastomeric.

The absorption of toner carrier liquid was also measured as described above. The absorption was 75%, which is also described as having a swell of 75% in the toner carrier liquid.

Comparative Example A

A release coating composition as disclosed in U.S. Pat. No. 5,652,078, containing less than 20 parts by weight of DMS-V41 a polymer with less than 3% vinyl containing siloxane groups was applied to an OPR.

In particular, the release coating composition was prepared by adding 93.5 heptane, SYL-OFF 4000 catalyst (1.10 g of a 10 weight percent solution of SYL-OFF 4000 catalyst in heptane), catalyst inhibitor (1.10 g of a heptane solution containing 7 weight percent diethyl fumarate and 3 weight percent benzyl alcohol), and crosslinker (1.40 g of SYL-OFF 7048 crosslinker) to 4.29 g VDT-731 and 0.58 g of a 15 weight percent heptane solution of vinyl terminated silicone resin trade designation DMS-V41 and 0.1% of CAB-O-SIL TS-720 for roughness (as described in U.S. Pat. No. 5,733, 698), to give a coating solution which contained 9.0 weight percent solids.

This release coating composition was coated on an inverted dual layer organic photoreceptor, as described in Example 1 above. A printing run was again performed on an electrophotographic printer. This belt produced 2,123 prints. The operating conditions and the cleaning methods used in printing on the electrophotographic printer were similar to those used in Example 1.

An attempt was made to measure the tensile properties of the release coating. The cured release was very brittle and could not be tested by the Instron equipment.

The amount of toner carrier liquid absorption for this release coating was 15%.

Examples 2–8

Release coating compositions were made as described above in Example 1 and then coated OPC belts, having an organic photoconductive layer, a barrier layer, and a tie layer, each as described above. The constructed belts were tested for extended run capability, as described above. Table 1, below, indicates the components in % by weight of total solids in each of the release coating compositions.

Examples 2–5, 7 and 8 also included 3 parts SYL-OFF 4000 catalyst and 1 part FBA inhibitor. Example 6 included 1.5 part SYL-OFF 4000 catalyst and 1.5 part FBA. Except Example 6, all other release compositions included 0.1 part of CAB-O-SIL TS-720.

Table 2, below, shows the tensile properties, percent swell, peel force and the run length indicated by the number of print copies. The extended run tests for Examples 1–8 were terminated not because the release surface failed but because only minor print failure occurred, which is shown as ">" (greater than) on the run length column, in Table 2. It is expected that these OPR belts would have run considerably longer with some cleaning as mentioned in Example 1.

TABLE 1

| Example: | 1 | Comp. Ex. A | 2 | 3 | 4 | 5 | 6 | Comp. Ex. B | 7 | 8 | Comp. Ex. C | Comp. Ex. D |
|---|---|---|---|---|---|---|---|---|---|---|---|---|
| VDT-954 | 11.5 | | | 5 | | 15 | | | 15 | 14 | | |
| VDT-731 | | 71.6 | 8 | | | | | | | | | |
| SE-33 | 37.2 | | | 38.5 | | 34.5 | 38.8 | | 50 | 50 | 89.3 | 62.2 |
| DMS-V52 | | | | | 77.6 | | | | 20 | 22.4 | | 32.2 |

TABLE 1-continued

| Example: | 1 | Comp. Ex. A | 2 | 3 | 4 | 5 | 6 | Comp. Ex. B | 7 | 8 | Comp. Ex. C | Comp. Ex. D |
|---|---|---|---|---|---|---|---|---|---|---|---|---|
| DMS-V41 |  | 1.5 |  |  |  |  |  |  |  |  |  |  |
| VQM-135 | 37.2 |  |  | 41 |  |  |  | 38.8 |  |  |  |  |
| VQM-146 |  |  | 82 |  |  | 34.5 |  |  |  |  |  |  |
| VQX-221 |  |  |  |  | 12 |  |  |  |  |  |  |  |
| TUFEL 94506 |  |  |  |  |  |  |  | 90 |  |  |  |  |
| SYLOFF 7048 |  | 23 | 6.5 |  | 6 | 6.4 |  |  |  |  |  |  |
| SYLOFF 7678 | 10 |  |  |  |  | 12 |  | 5 | 11 | 9.6 | 6.7 | 1.6 |
| CA-6 |  |  |  |  |  |  |  |  |  |  | 1 |  |
| SYLGARD 186 |  |  |  |  |  |  | 19.4 |  |  |  |  |  |

TABLE 2

| Example | Initial Peel Force | % Swell | Tensile Strength (Mpa) | % Elongation | Run Length (# of prints per OPR) |
|---|---|---|---|---|---|
| 1 | 8 | 73 | 3.76 | 210 | >20,050 |
| Comp. Ex. A | 5.9 | 15 | Brittle | <15 | 2123 |
| 2 | 12.4 | 75 | 3.6 | 209 | >5490 |
| 3 | 9.9 | 121 | 2.64 | 189 | >4750 |
| 4 | 12.5 | 100 | 2.5 | 350 | >5970 |
| 5 | 6.4 | 43 | 7.6 | 192 | >4105 |
| 6 | 7.5 | 120 | 0.75 | 400 | 4200 |
| Comp. Ex. B | 23.5 | 230 | 6.17 | 466 | 2100 |
| 7 | 3.5 | 58 | 2.9 | 216 | >5500 |
| 8 | 5.0 | 80 | 2.4 | 2.2 | >30,000 |
| Comp. Ex. C | 4.0 | 126 | 0.4 | 187 | <150 |
| Comp. Ex. D | 2.6 | 182.9 | 0.23 | 91 | Not tested |

It was surprisingly found that release coatings of the present invention demonstrated an acceptable balance of the characteristics that indicate its suitability as a release layer in a photoconductor. For example, a photoconductor including a release layer of the present invention showed a print run yielding greater than 30,000 color prints. Significantly, one embodiment of the present invention (a release layer containing a bimodal distribution of crosslinks with a high content of a low vinyl functional polymer and a low content of a high vinyl functional polymer of Example 8) provided a photoconductor belt having a significantly longer running life than could be achieved with the release coating containing a bimodal distribution of crosslinks with a low content of a low vinyl functional polymer and a high content of a high vinyl functional polymer, as is disclosed in U.S. Pat. No. 5,652,078 (Comparative Example A).

Furthermore, the release layers of the present invention, although swellable in the toner carrier liquid, still provided long print life in addition to the good print quality as expected from swellable release coatings. What has been surprisingly discovered in the present invention is that a combination of swellability, high tensile strength, high elongation and low peel force is essential for the release coating to achieve both long run and good print quality. Thus, the present invention unexpectedly provided the desirable properties for a long running photoconductor belt by a combination of bimodal distribution or by a combination of high molecular weight low vinyl containing siloxane polymer and an appropriate toughening agent.

Other conventional release coatings may only possess some of the desired characteristics. For example, one conventional release coating as disclosed in U.S. Pat. No. 5,652,078 (Comparative Example A) provided a print run yielding only about 2500 prints, although this release coating had good resistance to toner carrier liquids. In Comparative Example B, the release coating exhibited good tensile properties, and good swell, but the peel force was high (23.5 g/2.54 cm), resulting in a poorer run length, as compared to Examples 1–8. While not wishing to be bound by any particular theory, it is believed that the high peel force is probably due to the silica reinforcing additive in the TUFEL 94506, as in Comparative Example B. In Comparative Example C, swellable coatings of U.S. Pat. No. 5,733,698, exhibited good print quality, but poor durability and short print run even as compared to non-swellabale coatings of U.S. Pat. No. 5,652,078 (Comparative Example A). In Comparative Example D, an OPR belt with a swellable release coating produced only 150 prints before transfer failed due to wear of the release layer. Comparative Example C produced only 150 prints before transfer failed due to wear on the release layer. Comparative Example D exhibited poor tensile strength so no print tests could be conducted.

Example 9

A release composition of the present invention was also coated on a drying element for use in a electrophotographic system.

Into a tarred glass jar, 1875 parts of 100% heptane was added. To this was added 450.88 parts of SE-33 at 100% solids. The materials were mixed to form a solution by stirring with a double bladed 4-paddle mixer for three hours and 15 minutes at 2200 rpm. The jar was taken off the mixer, sealed, and put on a roller mill for 16 hours. The sealed jar was then removed from the roller mill. The glass jar was then opened, put on a balance and 6.25 parts of VDT 954 was added. This was followed by addition of 121.25 parts of SYLGARD 186 and 18.75 parts of FBA inhibitor. The components in the jar were then mixed for 15 minutes at 2200 rpm with the 4-paddle double bladed mixer. The jar was then taken off and put on the balance and 18.75 parts of SYL-OFF 7678 was then added. The jar was then put back on the mixer and the solution was mixed for 5 minutes. The jar was removed and 9.13 parts of SYL-OFF 4000 was added. The entire mixture was then mixed for an additional 15 minutes. Drying of a 1 g sample of this solution at 120° C. for 10 minutes indicated that the coating solution was 25% solids.

After mixing was completed, the mixture was filtered through a filter, DFL0430Y012Y by Porous Media (1.2 Microns absolute) at 25 cc/min.

A welded polyester belt, 16.25 in (42.78 cm)×9 in (22.86 cm), that included a 76.2 micrometer polyester base, a 100 Angstrom vapor coated aluminum layer coated with a 7.67 polyethylene terephthalate layer, was then coated with the release composition using a syringe coater.

The syringe coater was similar to that shown generally in FIG. 4 of U.S. Pat. No. 5,998,549 (Milbourn et al.). It essentially included an agar or screw type of unit that compressed a syringe to apply release composition at a controlled rate. The rate is typically dependent on the coating speed, % solids of the solution, diameter of the syringe, circumference of the belt or roll being coated, and desired dry coating thickness. For coating the belt herein, the following settings were used for the syringe coater:

Coating Speed=12 inches (30.48 cm)/minute
Desired Dry Thickness=7.2 mils (76.2 microns)
% Solids=25
syringe size=250 ml The coated release composition was allowed to dry at room temperature for 7 minutes and then placed in an oven at 150° C. for 10 minutes with the belt in a vertical position so that the coating was not disturbed before curing. After cure, the dry coating was measured to be 3.0 mils (76.2 microns) with a micrometer.

The following results were obtained as described above before running on the electrophotographic printer:

Peel force=1.2–3.5 gm/2.54 cm. (Average of 3 separate samples)

Absorption=85–105% (Range of 3 separate samples)

This material ran 21000 prints on an electrophotographic printer.

Example 10

In Example 10, a release coating composition of the present invention applied to an amorphous silicon drum photoconductor.

Part A: In a glass jar was added 2.4 g of VQM-135, 24 g of a 10 wt % heptane solution of SE 33, and 70.6 grams of heptane.

Part B: In a second jar was added 0.4 g SYLGUARD 186 curing agent, 0.3 g of an inhibitor solution in heptane which contained 7 weight percent diethyl fumarate and 3 weight percent benzyl alcohol, 0.3 g a 10 weight percent solution of Dow Corning SYL-OFF 4000 in heptane, and 66.6 g of heptane.

The Part A solution (32.4 g) was added to the second jar containing the Part B solution (67.6 g) to give a coating solution which contained 2.0 wt % solids. The coating solution was immediately applied to an amorphous silicon photoconductor drum (standard sensitivity, mirror finish, available from Kyocera, Kyoto Japan) by a ring coating method. In the ring coating process the uncoated drum is fixed with the drum axis in a vertical position. A gasket comprising a flat ring of polymer film (approximately 100 microns thick) clamped in a circular metal fixture with a radius approximately 0.5 cm greater than the drum is concentrically situated around the drum. A ring shaped reservoir formed from the drum surface, the polymer film gasket, and the wider circular metal fixture is filled with coating solution and is moved in a downward axial direction against the fixed drum, leaving a liquid film of coating solution on the drum. According to this example, the release coating solution was applied by translating the gasket assembly at a rate of about 1.0 cm/sec. The coated drum was allowed to dry at room temperature for about 5 minutes, then cured for 90 minutes in an oven held at 150° C.

The resulting drum was mounted into a mechanism having charge-discharge capabilities, an erase bar, and a single developing station and used in a liquid toner offset electrophotographic process to make monochrome black prints. The printing rate was 6 inches per second. After printing 43,000 prints, the drum was still capable of producing prints of good image quality with the exception of areas on the drum which had been damaged by handling, paper misfeeds, or other wearing. In particular, it was observed that the adhesion of toner to the drum surface was sufficiently low that individual pixels (about 50 microns diameter) were satisfactorily transferred.

Comparative Example E

A release coating composition containing less than 20 parts by weight of DMS-V41 a polymer with less than 3% vinyl containing siloxane groups was applied to an amorphous silicon drum photoconductor.

The release coating composition was prepared by adding 93.5 heptane, SYL-OFF 4000 catalyst (1.10 g of a 10 weight percent solution of SYL-OFF 4000 catalyst in heptane), catalyst inhibitor (1.10 g of a heptane solution containing 7 weight percent diethyl fumarate and 3 weight percent benzyl alcohol), and crosslinker (1.40 g of SYL-OFF 7048 crosslinker) to 4.29 g VDT-731 and 0.58 g of a 15 weight percent heptane solution of vinyl terminated silicone resin trade designation DMS-V41 to give a coating solution which contained 2.0 weight percent solids. The coating solution was applied to an amorphous silicon photoconductor drum (standard sensitivity, mirror finish, available from Kyocera, Kyoto Japan) by a ring coating method as described in Example 10. According to this example, the release coating solution was applied by translating the gasket assembly at a rate of about 1.0 cm/sec. The coated drum was allowed to dry at room temperature for about 5 minutes, then cured for 30 minutes in an oven held at 150° C.

The resulting drum was used in a liquid toner offset electrophotographic process to make monochrome black prints. The printing rate was 6 inches per second. After printing approximately 1000 prints, streaks of missing image parallel to the long dimension of the page began appearing on the prints. After 1760 prints, prints were obtained with large portions of missing print areas visible as wide stripes parallel to the long dimension of the page and the photoconductor drum was observed to have toner deposited in rings corresponding to the location of the missing print stripes.

Comparative Example E demonstrated that a release coating composition containing less than 20 parts by weight of a polymer with less than 3% vinyl containing siloxane groups is not capable to give greater than about 2000 prints when applied to an amorphous silicon photoconductor drum and used in a liquid toner electrophotographic printing process.

Example 11

A release coating composition of the present invention was applied to a primed amorphous silicon drum photoconductor.

A primer solution was prepared by adding in a glass jar 0.27 g of VDT-945, 1.33 g of SYL-OFF 7048, 0.23 g of an inhibitor solution in heptane which contained 7 weight diethyl fumarate and 3 weight percent benzyl alcohol, and 151 g of heptane.

The primer solution was applied to the primed amorphous silicon photoconductor drum (standard sensitivity, mirror finish, available from Kyocera, Kyoto Japan) by a ring coating method as described in Example 10 at a rate of about 1.0 cm/sec. The primed and coated drum was allowed to dry at room temperature for about 5 minutes, then cured for 15 hours in an oven held at 150° C.

A release coating composition according to the present invention was prepared by adding 1.55 g VQM-146, 12.3 g of 12.6 weight percent SE 33 in heptane, 183.6 heptane, 0.42 g of an inhibitor solution in heptane which contained 7 weight percent diethyl fumarate and 3 weight percent benzyl alcohol, 1.25 g a 10 weight percent solution of SYL-OFF 4000 in heptane, and 0.42 g SYL-OFF 7048 crosslinker to 0.48 g VDT-954 in a glass jar. The coating solution contained 2.0 weight percent solids. After shaking for 15 minutes to thoroughly mix the solution, it was applied to a primed amorphous silicon photoconductor drum (standard sensitivity, mirror finish, available from Kyocera, Kyoto Japan) by a ring coating method as described in Example 10 at a rate of about 1.0 cm/sec. The coated drum was allowed to dry at room temperature for about 5 minutes, then cured for 16 hours in an oven held at 150° C.

The resulting drum was mounted into a mechanism having charge-discharge capabilities, an erase bar, and a single developing station and used in a liquid toner offset electrophotographic process to make monochrome black prints. The printing rate was 9 inches per second and the surface of the photoconductor drum was held at 40–45° C. The drum was capable to print about 11,000 prints at which point areas of missing image appeared in printed sheets near the vertical margins of the page. The missing image corresponded to radial bands resulting from wear of the release coating.

Example 11 demonstrated that a release coating of the present invention is capable to give greater than 10,000 prints when applied to an amorphous silicon photoconductor drum and used to make electrophotographic prints at higher printing rates and temperatures.

All patents, patent applications, and publications disclosed herein are incorporated by reference in their entirety, as if individually incorporated. The foregoing detailed description and examples have been given for clarity of understanding only. No unnecessary limitations are to be understood therefrom. The invention is not limited to the details shown and described, for variations obvious to one skilled in the art will be included within the invention defined by the claims.

What is claimed is:

1. A photoconductor element comprising
an electroconductive substrate,
a photoconductive layer on one surface of the electroconductive substrate, and
over the photoconductive layer, a release layer comprising a silicone polymer which is the reaction product of components comprising:
(a) from zero to about 30 parts by weight of a polymer selected from the group consisting of

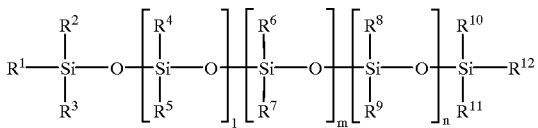

wherein $R^1$, $R^2$, $R^3$, $R^6$, $R^7$, $R^{10}$, $R^{11}$, and $R^{12}$ are each independently selected from an alkyl group, an alkenyl group, an aryl group, and an aralkyl group, such that at least one of $R^6$ and $R^7$ is an alkenyl group, $R^4$, $R^5$, $R^8$, and $R^9$ are each independently selected from an alkyl group, an aryl group, and an aralkyl group, l, m, and n are each independently an integer so long as the polymer contains greater than 3 mol % vinyl-containing siloxane groups; a (vinyl siloxy)(siloxy)-modified silica having a vinyl content of at least about 0.4 vinyl equivalent/kg; and a combination thereof;

(b) more than about 20 parts by weight of a polymer having the formula

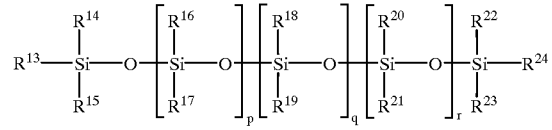

wherein $R^{13}$, $R^{14}$, $R^{15}$, $R^{18}$, $R^{19}$, $R^{22}$, $R^{23}$, and $R^{24}$ are each independently selected from an alkyl group, an alkenyl group, an aryl group, and an aralkyl group, such that at least two of $R^{13}$, $R^{14}$, $R^{15}$, $R^{18}$, $R^{19}$, $R^{22}$, $R^{23}$, and $R^{24}$ are alkenyl groups, $R^{16}$, $R^{17}$, $R^{20}$, and $R^{21}$ are each independently selected from an alkyl group, an aryl group, and an aralkyl group, p, q, and r are each independently integers so long as the polymer has less than 3 mol % vinyl-containing siloxane groups; and (c) up to about 20 parts by weight of a cross-linking agent of the formula

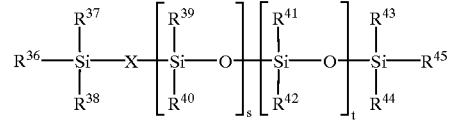

wherein $R^{36}$, $R^{37}$, $R^{38}$, $R^{43}$, $R^{44}$, and $R^{45}$ are each independly selected from hydrogen, an alkyl group, an aryl group, and an aralkyl group, $R^{39}$, $R^{40}$, $R^{41}$, and $R^{42}$ are each independently selected from hydrogen, an alkyl group, and an aryl group, X is O, or a divalent organic linking group, and S and t are independently integers so long as there are at least two functional groups capable of cross-linking per molecule.

2. The element of claim 1 in which the amount of the polymer in part (a) is from about 5 to about 20 parts by weight, the amount of polymer in part (b) is from about 30 to about 90 parts by weight, and the amount of the crosslinking agent is from about 5 to about 15 parts by weight.

3. The element of claim 1 in which the amount of the polymer in part (a) is from about 10 to about 16 parts by weight, the amount of polymer in part (b) is from about 60 to about 80 parts by weight, and the amount of crosslinking agent in part (c) is from about 8 to about 12 parts by weight.

4. The element of claim 1 wherein the polymer of part (a) contains greater than about 7 mol % vinyl-containing siloxane groups.

5. The element of claim 1 wherein in the polymer in part (b), the at least two of $R^{13}$, $R^{14}$, $R^{15}$, $R^{18}$, $R^{19}$, $R^{22}$, $R^{23}$, $R^{24}$ are vinyl-containing groups.

6. The element of claim 5 wherein the polymer in part (b) has a vinyl content less than about 2 mol % vinyl-containing siloxane groups.

7. The element of claim 5 wherein the polymer in part (b) has a vinyl content less than about 0.5 mol % vinyl-containing siloxane groups.

8. The element of claim 1 wherein at least one of $R^6$ and $R^7$ is a vinyl-containing group.

9. The element of claim 1 wherein the (vinyl siloxy)(siloxy)-modified silica is a vinyl Q resin.

10. The element of claim 9 wherein the (vinyl siloxy)(siloxy)-modified silica has the formula:

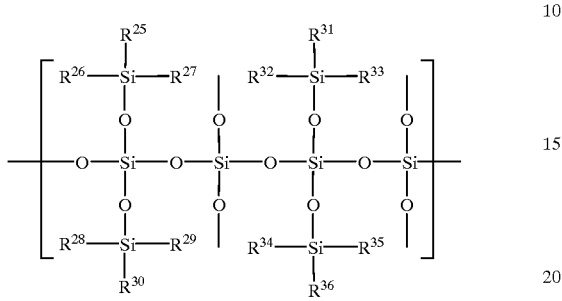

wherein $R^{25}$, $R^{26}$, $R^{27}$, $R^{28}$, $R^{29}$, $R^{30}$, $R^{31}$, $R^{32}$, $R^{33}$, $R^{34}$, $R^{35}$, and $R^{36}$ are each independently selected from an alkyl group, an alkenyl group, an aryl group, and an aralkyl group, wherein at least one alkenyl group, preferably a vinyl-containing group, is present in each of $-OSiR^{25}R^{26}R^{27}$; $-OSiR^{28}R^{29}R^{30}$; $-OSiR^{31}R^{32}R^{33}$; and $-OSiR^{34}R^{35}R^{36}$ so long as the polymer has a vinyl content of at least about 0.4 vinyl equivalent/kg.

11. The element of claim 1 wherein the (vinyl siloxy)(siloxy)-modified silica is a (methylvinylsiloxy), trimethylsiloxy modified silica.

12. An electrophotographic system for producing a multi-colored image comprising:
  a photoreceptor comprising:
    a photoconductor element having a first major surface and a second major surface; and
    a barrier layer on the first major surface of the photoconductor element;
  a positioner for movably positioning the photoreceptor in order that a given portion of the photoreceptor sequentially advances through a plurality of locations in a single pass;
  at least one image-wise exposing device for exposing the photoreceptor with radiation modulated in accordance with an image data for one of a plurality of colors in order to partially discharge the photoreceptor to a first discharge level to produce an image-wise distribution of charges on the photoreceptor corresponding to the image data for the one of a plurality of colors;
  at least one applicator to apply a first color liquid toner comprising charged particles of the first color and transparent counter-ions, using an electrode electrically biased to a voltage of between the predetermined charge level and the first discharge level, to the photoreceptor as a function of the image-wise distribution of charges on the photoreceptor to form a first color image, wherein a second substantially uniform predetermined photoreceptor charge level results such that it is lower than the first predetermined charge level but being sufficiently high to subsequently repel liquid toner in areas not subsequently further discharged;
  a transferor to transfer at least the first color image and the second color image to a medium to form the multi-colored image; and
  a drying element for drying the multi-colored image, wherein at least one of the organic photoconductor and the drying element comprises a release layer comprising a silicone polymer which is the reaction product of components comprising:
    (a) from zero to about 30 parts by weight of a polymer selected from the group consisting of

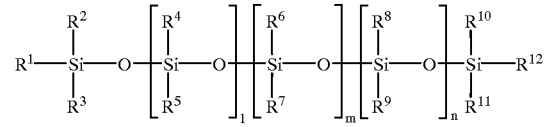

wherein $R^1$, $R^2$, $R^3$, $R^6$, $R^7$, $R^{10}$, $R^{11}$, and $R^{12}$ are each independently selected from an alkyl group, an alkenyl group, an aryl group, and an aralkyl group, such that at least one of $R^6$ and $R^7$ is an alkenyl group,
    $R^4$, $R^5$, $R^8$, and $R^9$ are each independently selected from an alkyl group, an aryl group, and an aralkyl group,
    l, m, and n are each independently integers so long as the polymer contains greater than 3 mol % vinyl-containing siloxane groups; a (vinyl siloxy)(siloxy)-modified silica having a vinyl content of at least about 0.4 vinyl equivalent/kg; and a combination thereof;
    (b) more than about 20 parts by weight of a polymer having the formula

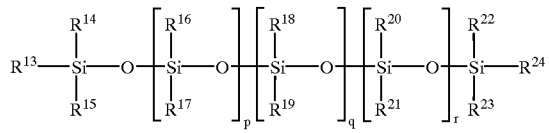

wherein $R^{13}$, $R^{14}$, $R^{15}$, $R^{18}$, $R^{19}$, $R^{22}$, $R^{23}$, and $R^{24}$ are each independently selected an alkyl group, an alkenyl group, an aryl group, and an aralkyl group, such that at least two of $R^{13}$, $R^{14}$, $R^{15}$, $R^{18}$, $R^{19}$, $R^{22}$, $R^{23}$, and $R^{24}$ are alkenyl groups,
    $R^{16}$, $R^7$, $R^{20}$, and $R^{21}$ are each independently selected from an alkyl group, an aryl group, and an aralkyl group,
    p, q, and r are each independently integers so long as the polymer has less than 3 mol % vinyl-containing siloxane groups; and
    (c) up to about 20 parts by weight of a cross-linking agent of the formula

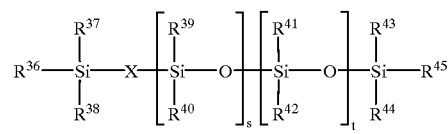

wherein $R^{36}$, $R_{37}$, $R^{38}$, $R^{43}$, $R^{44}$, and $R^{45}$ are each independently selected from hydrogen, an alkyl group, an aryl group, and an aralkyl group,
    $R^{39}$, $R^{40}$, $R^{41}$, and $R^{42}$ are each independently selected from hydrogen, an alkyl group, and an aryl group,
    X is O, or a divalent organic linking group, and
    s and t are independently integers so long as there are at least two functional groups capable of cross-linking per molecule.

13. The electrophotographic system of claim 12, wherein the photoconductor is in the form of an endless belt.

14. The electrophotographic system of claim 12, wherein the photoconductor is in the form of a drum.

15. The electrophotographic system of claim 14, wherein the drum is an amorphous silicon drum.

16. The electrophotographic system of claim 12, wherein the drying element is in the form of an endless belt.

* * * * *